(12) United States Patent
Bijker et al.

(10) Patent No.: US 12,522,920 B2
(45) Date of Patent: Jan. 13, 2026

(54) PARTIAL COATING OF INTRAOCULAR LENSES USING SPATIAL ATOMIC LAYER DEPOSITION

(71) Applicant: AMO Groningen B.V., Groningen (NL)

(72) Inventors: Martin Dinant Bijker, Helmond (NL); Emerentius Marie Josephus Antonius Van Dijk, Bergeijk (NL); Theophilus Bogaert, Groningen (NL); Klaas Sikkens, Briltil (NL)

(73) Assignee: AMO Groningen B.V., Groningen (NL)

( * ) Notice: Subject to any disclaimer, the term of this patent is extended or adjusted under 35 U.S.C. 154(b) by 957 days.

(21) Appl. No.: 17/445,327

(22) Filed: Aug. 18, 2021

(65) Prior Publication Data

US 2022/0064792 A1 Mar. 3, 2022

Related U.S. Application Data

(60) Provisional application No. 63/070,180, filed on Aug. 25, 2020.

(51) Int. Cl.
*C23C 16/455* (2006.01)
*A61F 2/16* (2006.01)
*C23C 16/458* (2006.01)

(52) U.S. Cl.
CPC .......... *C23C 16/45536* (2013.01); *A61F 2/16* (2013.01); *C23C 16/458* (2013.01); *A61F 2002/1681* (2013.01); *A61F 2240/001* (2013.01)

(58) Field of Classification Search
CPC ... C23C 16/45536; C23C 16/458; A61F 2/16; A61F 2002/1681; A61F 2240/001; B29D 11/00865; B29D 11/00942; B29D 11/023; B29D 11/00423
See application file for complete search history.

(56) References Cited

U.S. PATENT DOCUMENTS

| | | | |
|---|---|---|---|
| 4,413,022 A | 11/1983 | Suntola et al. | |
| 5,007,928 A | 4/1991 | Okamura et al. | |
| 5,153,072 A | 10/1992 | Ratner et al. | |
| 5,618,316 A | 4/1997 | Hoffman et al. | |
| 5,674,435 A * | 10/1997 | Blake .................. | B29C 33/0033 264/161 |
| 5,837,156 A | 11/1998 | Cumming | |
| 6,142,626 A | 11/2000 | Lu et al. | |
| 7,749,574 B2 | 7/2010 | Mahajani et al. | |
| 8,501,637 B2 | 8/2013 | Matero et al. | |
| 9,243,322 B2 | 1/2016 | Dodge et al. | |
| 9,263,251 B2 | 2/2016 | Mizuno et al. | |
| 9,287,113 B2 | 3/2016 | Kang et al. | |

(Continued)

FOREIGN PATENT DOCUMENTS

EP 0311611 A1 4/1989
EP 2334842 B1 5/2012

(Continued)

*Primary Examiner* — Alexander M Weddle

(57) ABSTRACT

A system and method for efficiently modifying the surface of an intraocular lenses to reduce tackiness and improve lens unfold time and unfold time consistency, and a product created using the system and method, is disclosed. In some embodiments, the system and method utilizes at least part of a lens-forming device as a mask.

11 Claims, 14 Drawing Sheets

(56) References Cited

U.S. PATENT DOCUMENTS

| | | | |
|---|---|---|---|
| 9,291,747 B2 | 3/2016 | Fournand et al. | |
| 9,425,071 B2 | 8/2016 | Yabe et al. | |
| 9,460,912 B2 | 10/2016 | Chandra et al. | |
| 9,566,749 B2 | 2/2017 | Van | |
| 10,246,774 B2 | 4/2019 | Van Cleemput | |
| 10,302,820 B2 | 5/2019 | Leclaire | |
| 10,515,795 B2 | 12/2019 | Kim et al. | |
| 10,593,541 B2 | 3/2020 | Kato | |
| 2002/0018849 A1 | 2/2002 | George et al. | |
| 2003/0116873 A1 | 6/2003 | Ayyagari et al. | |
| 2004/0052972 A1 | 3/2004 | Schmitt | |
| 2006/0251795 A1* | 11/2006 | Kobrin | A61L 27/34 427/535 |
| 2007/0238311 A1 | 10/2007 | Levy | |
| 2007/0276482 A1 | 11/2007 | Coroneo | |
| 2009/0076603 A1* | 3/2009 | Avery | B29D 11/00865 623/6.43 |
| 2009/0081360 A1* | 3/2009 | Fedorovskaya | C23C 16/45529 427/160 |
| 2009/0234450 A1 | 9/2009 | Lowery et al. | |
| 2013/0209785 A1 | 8/2013 | Cadet et al. | |
| 2014/0023794 A1* | 1/2014 | Mahajani | C23C 16/45534 427/535 |
| 2014/0252667 A1* | 9/2014 | Van Dijk | B29C 33/303 351/159.02 |
| 2016/0051734 A1 | 2/2016 | Görne | |
| 2016/0223716 A1 | 8/2016 | Nouvelot et al. | |
| 2017/0137939 A1 | 5/2017 | Creyghton et al. | |
| 2018/0243081 A1 | 8/2018 | Chen et al. | |

FOREIGN PATENT DOCUMENTS

| | | |
|---|---|---|
| EP | 3359706 B1 | 3/2019 |
| KR | 101979885 B1 | 5/2019 |
| WO | 2017131588 A1 | 8/2017 |
| WO | 2019067912 A1 | 4/2019 |

* cited by examiner

PARTIAL COATING OF INTRAOCULAR LENSES USING SPATIAL ATOMIC LAYER DEPOSITION

CROSS REFERENCE TO RELATED APPLICATION

This application claims the benefit of U.S. Provisional Application No. 63/070,180, filed Aug. 25, 2020, the contents of which are incorporated by reference as if fully set forth.

FIELD OF INVENTION

This disclosure is directed to the deposition of a thin coating layer on a polymeric material. These coated materials, which have reduced tackiness, improved unfolding time and improved consistency in unfold time, may be used in ophthalmic devices, such as intraocular implants or lenses.

BACKGROUND

Cataract surgery is commonly performed to replace the natural lens of an eye that has become opaque. Materials that are used to replace the natural crystalline lens must be soft and have excellent flexibility. They are delicate devices which must be resilient, as they are first rolled tightly, then inserted through very small incisions into the eye. The compression and tensile stresses put on the lens as it is compressed and forced through an insertion tip are not insubstantial. Once inserted, this compressed lens must unfold within a time that is slow enough to allow a surgeon to appropriately position the lens, yet not so long that causes undue delay or patient discomfort. The tackiness of the lens material is one factor which may slow or even inhibit the lens unfolding.

Many of these soft, flexible materials that are used for foldable lenses tend to possess "self-tackiness". This tackiness leads to longer unfold times once the lenses are implanted into the eye. This is particularly true with regards to the haptics, or support structures for positioning an intraocular lens (IOL) in an eye, which are folded over the anterior optic so that they are touching the anterior surface of the lens and each other during insertion into the eye. As used herein, the term "haptics" may comprise any of a variety of support structures for positioning an IOL in an eye. Tackiness, in combination with the forces which encourage the haptics (i.e., any of a variety of support structures for positioning an IOL in an eye), towards the anterior surface of the lens during folding and insertion can lead to unpredictable and often long unfold times. In some instances, the lenses must be manually unfolded once implanted into the eye.

Various approaches are taken to reduce self-tackiness. In some cases, the entire lens may be coated with a hydrophilic coating. This allows for separation of the surfaces in aqueous environments, and thus a more rapid and reliable unfolding of the lens once implanted into the eye.

While hydrophilic lenses do have some benefits, there are still benefits to hydrophobicity in an intraocular lens. One advantage is that hydrophobic surfaces may adhere better to the posterior bag, which will help delay or prevent posterior capsular opacification.

In some instances, a coating may be applied using vacuum or low-pressure chemical vapor deposition. Plasma treatment may be used to facilitate such coatings. Alternatively, as described in U.S. Publication No. 2009/0076603 (Avery et al.), atmospheric pressure chemical vapor deposition may be used to apply a partial coating. Chemical vapor deposition describes a process whereby a vaporized material can be used to coat a substrate with a thin film. With this process, the coating molecules are formed in vapor form and settle onto the surface of a substrate. As may be seen from U.S. Publication No. 2009/0076603 (Avery et al.), the process requires the time-consuming step of applying a mask to targeted portions of each lens. The lenses are then each individually placed on a conveyer. These steps require physical manipulation of the lenses. Every time a lens is touched during manufacturing, potential for damage is increased, e.g., by being dropped, by damage to the optical surface, or by other, inadvertent means. In a best-case scenario, such damage reduces manufacturing yields. In a worst-case scenario, the damage could result in a less than optimal outcome for a patient.

Coating thickness is a concern when using vapor deposition, since care must be taken to ensure that the vapor deposited coating extends over the entire substrate. This concern applies to the upper surfaces of the substrate. It is even more of a concern with regards to non-horizontal surfaces, such as edges/sides and bottoms. Attempts to ensure an adequate coating may lead to an unduly thick coating being applied.

Furthermore, these processes are suitable for only certain types of situations. Some substrates and uses of substrates have limitations as to the thickness of the coating that may be applied. Other methods are time-consuming, and inefficient.

Accordingly, there is a need for a coating, and an efficient, safe method of applying a thin coating to a lens in a manner which will reduce self-tackiness yet not unduly interfere with the optics of the lens.

SUMMARY

In one embodiment, there is a system and method for modifying the surface of an intraocular lens (IOL) using spatial atomic layer deposition. In one embodiment, this surface modification is performed while the lens is contained in a device or portion of a device that is used during the formation of the lens. In one embodiment, such device or portion of a device may be a portion of a mold. In another embodiment, such device or portion of a device is a holder that is used during the lathing process. During processing, the IOL is delivered to the spatial atomic layer deposition system while still in its device or portion of a device. The spatial atomic layer deposition system then processes the lens through a plurality of coating segments which are used to perform the surface modification. Each coating segment includes a first inert gas source configured to provide inert gas, a precursor injector source configured to provide a precursor gas, a second inert gas source configured to provide inert gas, and a plasma source configured to provide plasma. When the coating segments are activated, and the lenses move through the coating segments, each segment lays down a very thin layer of coating. The plurality of coating segments collectively provide a uniform coating of sufficient thickness to achieve the desired surface modification.

In one embodiment, there is a system and method for coating an intraocular lens (IOL) using spatial atomic layer deposition. In one embodiment, this coating is performed while the lens is contained in a device or portion of a device that is used during the formation of the lens. In one embodiment, such device or portion of a device may be a portion of a mold. In another embodiment, such device or portion of a device is a holder that is used during the lathing process. During processing, the IOL is delivered to the spatial atomic layer deposition system while still in its device or portion of a device. The spatial atomic layer deposition system then processes the lens through a plurality of coating segments. Each coating segment includes a first inert gas source configured to provide inert gas, a precursor injector source configured to provide a precursor gas, a second inert gas source configured to provide inert gas, and a plasma source configured to provide plasma. When the coating segments are activated, and the lenses move through the coating segments, each segment lays down a very thin layer of coating. The plurality of coating segments collectively provide a uniform coating of sufficient thickness to achieve the desired result.

In one embodiment, the efficiency is at least partially achieved by using the device or portion of the device that is used to form the lens during both the lens-forming and the lens-coating processes. In another embodiment, the efficiency is achieved by the device or portion of the device that is used to form the lens during both the lens-forming and the lens-coating processes, and further by using it to at least partially mask the lens body while allowing a portion of the support structure that is located away from the lens body to receive a coating along substantially its entire circumferential surface. Such a mask may be desired from a functionality/desired coating area perspective. That is, for some materials, it may be preferred to coat only a portion of the finished product. Alternatively, such a mask may be desirable from an efficiency perspective. In such instance, it may be preferable to coat the material, for example, a lens, without significantly handling the lens. A reduction in required handling steps typically results in fewer inadvertent manufacturing defects.

In the above described embodiments, when the at least one support structures are at least partially removed from the mold and/or the device that is used during lens formation, the coating is applied to the anterior surface of the lens body and a portion of the lens support structure, including substantially all of the circumferential surface of the portion of the at least one lens support structures that is located away from the lens body.

DETAILED DESCRIPTION OF THE PREFERRED EMBODIMENTS

Figure 1:
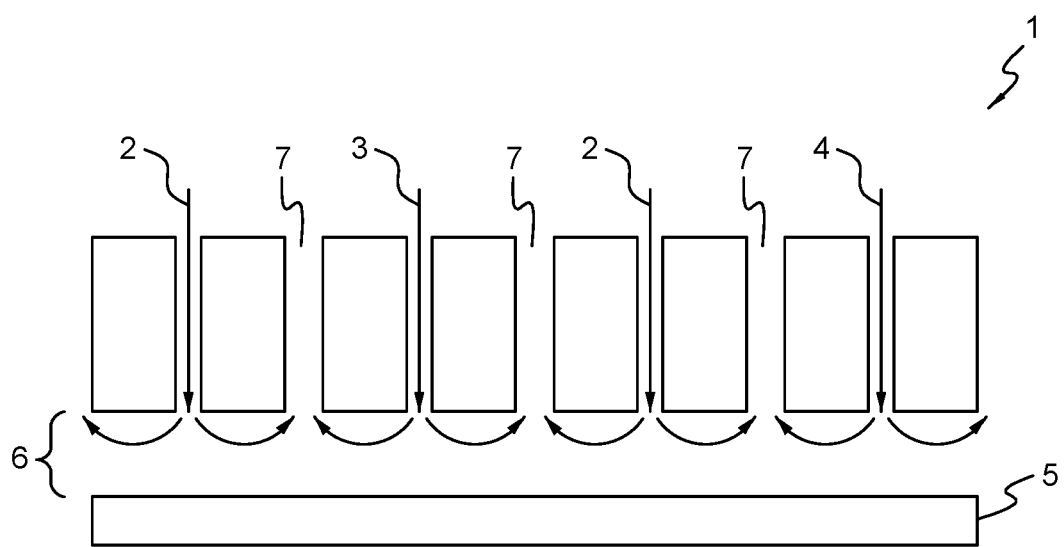
FIG. 1 is a diagram of a repeating unit, or coating segment, which forms part of a processing line, according to an embodiment.

It is to be understood that the disclosure is not limited to the details of construction or process steps set forth in the following description. The disclosure is capable of other embodiments and of being practiced or being carried out in various ways using the teaching herein.

The present disclosure discusses how the surface of a polymeric material may be modified by applying a thin, uniform coating to one or more surfaces of the polymeric material. This coating is chemically bound to the surface of the polymeric material.

The coating that is applied as part of the present disclosure is applied using Spatial Atomic Layer Deposition (s-ALD). Atomic Layer Deposition (ALD) is a technique used to grow thin films on substrates. It is based on sequential exposure of a substrate to self-limiting surface half-reactions. With ALD, the substrate is exposed to sequential precursors, then a purge step. s-ALD is a variation of ALD. In s-ALD, precursors are continuously supplied in different locations. These regions are separated by an inert gas region or zone. Film growth is accomplished by exposing the substrate to the locations containing the different precursors. One benefit of s-ALD is that the purge steps used in ALD are not necessary. This allows for substantially faster deposition rates. Additionally, s-ALD may be performed at ambient conditions (i.e., atmospheric pressure, no vacuum), which allows the process to proceed in a continual layout. In contrast, use of a vacuum is more consistent with a batch process.

ALD and s-ALD may be distinguished from other coating processes in that the ALD/s-ALD process lays down a thin, uniform coating of a gaseous precursor which is then chemically activated by plasma to form the desired coating. Simultaneously, the plasma treatment chemically bonds the coating to the surface of the substrate. From a step-by-step viewpoint, a thin layer of gaseous precursor is first allowed to settle over that portion of the substrate that is open to the gas (i.e., not masked in some form). The precursor gas is then removed from contact with the substrate. Next, plasma is allowed to react with the precursor that is on the substrate. The plasma may be selected to chemically bond with the chosen precursor to form the desired coating. By way of example, in some embodiments, when the desired coating is an oxide, oxygen plasma may be used. In some embodiments, when a nitride is desired, nitrogen plasma may be used. Similarly, in some embodiments, when a carbide is desired, CO or $CO_2$ plasma may be used. In some embodiments, nitric oxide is used.

The plasma encourages the formation of bonds between the plasma molecules and the precursor, as well as between the precursor and unreacted groups in the substrate, which results in a coating over the entire unmasked surface of the substrate. By way of example, when the plasma is oxygen plasma, the plasma may encourage the formation of bonds between the oxygen and the precursor, as well as between the precursor and unreacted acrylates in the substrate, which results in a coating over the entire unmasked surface of the substrate that is chemically bonded to the substrate. The chemical bonding of the coating to the substrate results in a chemical modification of the surface. As a result of the ALD/s-ALD treatment, the coated surface of the substrate is less tacky and therefore has a reduced tendency to stick to itself. While reducing unfold times, the coating method as described herein also improves consistency and predictability in unfold times.

When coating an intraocular lens, it is important that the coating thickness be well-controlled. First, thicker coatings (about 25 nm and greater) have the potential to have an impact on the optical performance of the lens. That is, with a thicker coating, the likelihood that a patient would see a difference in refractive index between the coating and the lens/haptic material as a reflection is increased. A thicker coating may cause crazing of the coating, or may cause chemical reactions when the lens is exposed to other chemicals (e.g., during chemical sterilization of a lens). Thick coatings also have the potential to shed particles during an implantation procedure. From a surgical perspective, it is undesirable to leave coating particles loose in the eye after a procedure. Lastly, as lens technology improves, it is becoming increasingly feasible to form intraocular lenses that have a thinner cross-section. As a lens thickness (i.e., distance along the optical access) slims, any coating on that lens may also be reduced in thickness to keep the relative thickness between the coating and the lens body consistent. A thinner lens can also fold more tightly, which creates areas of higher stress concentrations. Where a thin coating is desired, a relatively thicker coating can lead to an increased likelihood that a patient have a negative experience or experience detrimental lens performance.

In other applications, a thicker coating may be desired. This may be important, for example, for high refractive lens materials to reduce reflections, in particular when the refractive material is between the refractive index of aqueous and the lens material. Thus, control over the coating thickness is an important aspect of IOL manufacturing.

Use of the ALD/s-ALD process as described herein, where the coating is laid down over the entire unmasked surface of the substrate in a layer-by-layer process, allows for a uniform coating of controlled thickness.

Multiple s-ALD configurations are suitable for use in the method according to the present disclosure, though those in the art which already demonstrate certain efficiencies are preferred. By way of example, U.S. Pat. No. 4,413,022 (Suntola et al.) discloses a method for growing compounds on thin films. The system in this reference is linear, and may reciprocate. U.S. Publication No. 2004/0052972 (Jacques Schmitt) discloses a method and apparatus for ALD on a rotary susceptor. EP 2 334 842 (Maas et al.) describes an ALD apparatus and method which provides improved use of precursor gas, which can be quite costly.

FIG. 1 is a diagram illustrating one repeating unit 1 which makes up a portion of the processing line of an s-ALD system. Repeating unit 1 may also be referred to as a coating segment. The repeating unit 1 may be comprised of a number of elements: two inert gas sources 2, a precursor source 3, and a plasma source 4. A process gap 6 may be located between the material sources and a conveyor 5. Each element as shown is equipped with two exhausts 7. The exhausts 7 may be shared with the adjacent element, or separately formed. As noted above, an s-ALD system will require a plurality of repeating units 1 to lay down a plurality of molecular layers to achieve a coating of desired thickness.

The shape of the opening in the inert gas source 2 may vary. In some embodiments, the inert gas source 2 may be oval, round, square, rectangular or slot-like in shape. The shape and size of the opening in the inert gas source 2 may be selected to ensure that it provides an effective separation between the environment in the precursor source 3 and plasma source 4.

The shape of the opening in the precursor source 3 may vary. In some embodiments, the precursor source 3 may be oval, round, square, rectangular or slot-like in shape. The shape and size of the opening in the precursor source 3 may be selected to ensure that the precursor may be deposited evenly on the surface of the substrate.

The shape of the opening in the plasma source 4 by which the plasma is delivered may vary. In some embodiments, the plasma source 4 may be oval, round, square, rectangular or slot-like in shape. The shape and size of the opening in the plasma source 4 opening may be selected to ensure that plasma is provided in a substantially uniform amount over the full surface of the substrate. This may result in a uniform layer conversion from precursor to coating. In some embodiments, the opening in the plasma source takes the shape of a rectangle or slot.

Each element may comprise a supply and an exhaust 7. In some embodiments, each element consists of a supply and more than one exhaust 7. In some embodiments, each element consists of a supply and two exhausts 7. In some embodiments, the exhausts 7 are placed towards a side of the conveyor.

As described so far, each element consists of one supply of material. In some embodiments, each element (i.e., an inert gas source 2, a precursor source 3, and a plasma source 4) is made up of a plurality of unit segments. By unit segment it is meant that there are two units of the same element. That is, instead of having only one source with two exhausts, there would be a second source coupled with exhausts immediately following the first. In one embodiment, each element is made up of 1 to 8 unit segments. In one embodiment, each element is made up of 1 to 6 unit segments. In one embodiment, each element is made up of 1 to 4 unit segments. In one embodiment, each element is made up of 1 to 3 unit segments. In one embodiment, each element is made up of 2 unit segments. In one embodiment, each purge area/inert gas element would be made up of 2 unit segments.

An intraocular lens may comprise a central lens portion and at least one support structure. The at least one support structure may be any shape known in the art. In some embodiments, the lens support structure is a haptic. In some embodiments, the intraocular lens may be formed as one piece. Alternatively, the at least one support structure may be joined to the lens after it is formed. In some embodiments, the intraocular lens is molded. The term molded includes lenses that are fully formed in optically accurate form through the molding process as well as lenses that are at least partially formed through a molding process. In one embodiment, where lenses are molded in optically accurate form, the substrate holder may be the one half of the lens mold. In another embodiment, where lenses are lathed prior to receiving the coating, the substrate holder may be the lens holder that is used during the lathing process. The lens holder that is used during the lathing process may or may not be a portion of lens mold. In the foregoing embodiment, the lens may or may not be molded.

The molded lenses may receive a coating via s-ALD while still at least partially encased in a device that was used during their formation. In some embodiments, the device is one that was used for holding the lens during a lathing process. In other embodiments, the device is a lens mold. In some embodiments, one side of the mold is removed and one side is retained. In other embodiments, the retained side masks substantially all of the posterior side of the lens.

The foregoing process is efficient in that the lenses do not have to be first fully removed from the device that is used during their formation, then separately placed in a distinct carrier system and/or masked. The use of the existing device potentially decreases waste and saves time. It also reduces the degree to which each lens is being handled, which lessens the opportunity for inadvertent damage to the lens, hence increasing manufacturing yields of the lenses and potentially improving patient outcomes. Lastly, when the device is used as a mask, the need for a mask to be separately applied is eliminated, which again leads to improved efficiency.

When the lens is coated via s-ALD while at least partially encased in its mold or other device that is used during lens formation, it is partially masked by that device. In one embodiment, such masking may be accomplished by maintaining the lens in one side of a mold that is used to mold the lens, while removing the other side of the lens-forming mold. In another embodiment, such masking may be accomplished by maintaining the lens in the side of the mold that is used to mold the posterior side of the lens, while removing the side of the lens-forming mold that forms the anterior side of the lens. In another embodiment, such masking may be accomplished by maintaining the lens in the side of the mold that is used to mold the bottom side of the lens, while removing the side of the lens-forming mold that forms the top side of the lens. In another embodiment, the lens body may be maintained in one side of the mold that is used to form the lens, while the at least one lens support structure have been released from the mold. In another embodiment, the lens body may be maintained in the side of the mold that is used to form the posterior side of the lens, while the at least one lens support structure has been released from the mold. In another embodiment, the lens body may be maintained in one side of the mold that is used to form the lens, while the at least one lens support structure has been partially released from the mold. In another embodiment, the lens body may be maintained in the side of the mold that is used to form the posterior side of the lens, while the at least one lens support structure has been partially released from the mold. In another embodiment, the lens body may be maintained in the side of the mold that is used to form the posterior side of the lens, while the portion of the mold that is used to form the at least one lens support structure has been removed. In another embodiment, the masking may be accomplished by maintaining the lens in the device that is used during lens formation. In yet another embodiment, the masking may be accomplished by maintaining the lens in the device that is used during lens formation, while a portion of associated one or more lens supporting devices are not supported by the device. In another embodiment, where it is desired that the at least one lens support structure has a coating thickness that differs from the coating on the optic, the lens may be masked or oriented so that only the at least one lens support structure is exposed to the s-ALD.

In some embodiments, the at least one lens support structure is partially removed from the mold and/or the device that is used during lens formation. Such partial removal may be accomplished by removing a distal portion of a lens support structure from the device, while allowing the portion of the lens support structure that is closer to the lens to remain in the device. This partial removal allows for substantially full coating of those portions of the lens support structures that engage the anterior face of the lens during insertion.

In the above embodiments, when the at least one lens support structure is at least partially removed from the mold and/or the device that is used during lens formation, the coating is applied to substantially all of the circumferential surface of a portion of the lens support structure that is located away from the lens body as well as to a portion of the remaining lens support structure, and one side of the lens body. In one embodiment, the coating is applied to substantially all of the circumferential surface of more than 75% of the lens support structure. In one embodiment, the coating is applied to substantially all of the circumferential surface of more than 50% of the lens support structure. In one embodiment, the coating is applied to substantially all of the circumferential surface of more than 25% of the lens support structure.

In another embodiment, additional masking may be performed by either chemical or physical means. In one embodiment, this additional masking may be performed using Teflon tape or tape with an adhesive backing. In one embodiment, this additional masking may be performed using a chemical coating or barrier. In one embodiment, this additional masking may be performed using a removable chemical coating or barrier. In one embodiment, additional masking may be performed by placing a mask underneath the precursor source, or by changing the shape of the opening in the precursor source. In one embodiment, this additional masking may be performed by ink jet printing a deposition-resistant block on the substrate. Many other masking methods are known in the art, and all such masking methods may be utilized in association with the present disclosure.

In one embodiment, an apparatus for s-ALD may include a precursor source. The precursor source will include an opening that is separated from the substrate surface by a deposition space that is defined by the distance between the opening in the precursor source and the substrate surface. The opening in the precursor source is designed to provide a precursor gas from the precursor supply into the deposition space so that the precursor gas may contact the substrate surface. In one embodiment, the precursor supply may form the gas to which the substrate is exposed. In another embodiment, the gas to which the substrate is exposed may be formed of a precursor gas and an inert bearing-gas which is distinct from the precursor gas.

The distance between (a) the precursor source and the substrate holder, (b) the inert gas source and the substrate holder, and (c) the plasma source and the substrate holder, are fixed. In one embodiment, these distances are mechanically fixed. In another embodiment, these distances are controlled/fixed using a motorized system. Collectively, these distances will be referred to in terms of spacing away from the injector head.

In one embodiment, one or more of the portion of the precursor source, the inert gas source, and the plasma source that provide material to the substrate may be circular in configuration. In another embodiment, one or more of the portion of the precursor head, the inert gas inlet and the plasma source that provide material to the substrate may be in a slit configuration. In another embodiment, one or more of the portion of the precursor head, the inert gas inlet and the plasma source that provide material to the substrate may be in a slit configuration that has approximately the same width/diameter as a cross-section of the substrate. In another embodiment, one or more of the portion of the precursor head, the inert gas inlet and the plasma source that provide material to the substrate independently have either a sizing that has approximately the same width/diameter as a cross-section of the substrate or a sizing that has a width/diameter that is smaller than a cross-section of the substrate.

In one embodiment, the injector head is positioned between 100 and 400 microns away from top of the substrate holder. This distance is referred to as the process gap 6. In another embodiment, the injector head is positioned between 150 and 250 microns away from top of the substrate holder. In another embodiment, the distance between the injector head and the substrate holder is 200 microns.

Figure 2:
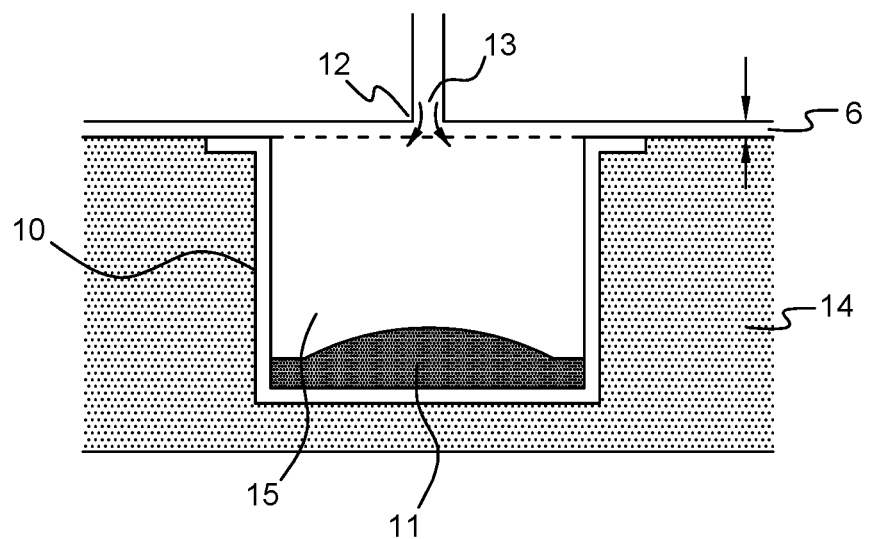
FIG. 2 is a diagram of a substrate holder and substrate in the system under plasma or gas flow, according to an embodiment.

FIG. 2 is a diagram of a substrate holder 10 and substrate 11 in the system under plasma or gas flow, according to an embodiment. In one embodiment, the substrate holder 10 extends beyond the height of the substrate 11. In the embodiment illustrated in FIG. 2, the flow 12 of precursor or plasma is shown by the curved arrows. In one embodiment, the distance from the injector head 13 to the substrate 11 (i.e., the deposition space) is from about 1 mm to about 5 mm. In another embodiment, the distance from the precursor injector head 13 to the substrate 11 is from about 2 mm to about 5 mm. In another embodiment, the distance from the precursor injector head 13 to the substrate 11 is from about 3 mm to about 5 mm. In another embodiment, the distance from the precursor injector 13 head to the substrate 11 is about 4 mm. In the embodiment illustrated in FIG. 2, the substrate holder 10 is contained in a holder 14.

Those in the art will appreciate that this deposition space is atypically large for s-ALD. This forgiving distance, when coupled with the comparatively small spacing between the injector head 13 and the top of the substrate holder 10, is what allows the system to work so well with intraocular lenses. When the substrate holder 10 extends beyond the surface of the substrate 11, it allows spacing for a variation in heights for substrate 11. That is, for example, the same system is equally suited to coat curved 34 diopters lenses as virtually flat diopters lenses.

The comparatively small process gap 6 serves almost as a valve to cut off supply of material to the interior 15 of the substrate holder. In one embodiment, this small process gap 6 allows for the inclusion of only one purge station between precursor/plasma, and plasma/precursor. In another embodiment, more than one purge station between precursor/plasma, and plasma/precursor is included.

Exposure time of the substrate to the various portions of the repeating unit (purge, precursor, plasma) may be selected by varying the length of each repeating unit segment and/or the rate of the movement of the substrate through the repeating unit. Typically, the substrate is exposed to the precursor area a plurality of times in order to achieve a sufficient coating. In one embodiment, one exposure of the substrate is to the precursor area is 200-400 ms. In another embodiment, one exposure of the substrate to the precursor area is 225-350 ms. In another embodiment, one exposure of the substrate to the precursor area is 250-300 ms. A person having ordinary skill in the art will appreciate that exposure time may be reduced if the amount of material at the various portions of the repeating unit (purge, precursor, plasma) could be increased in concentration or flow. A person having ordinary skill in the art may be able to determine what the minimum exposure time is for each situation.

An apparatus for s-ALD according to one embodiment will include a source of plasma. In one embodiment, the plasma is oxygen plasma. Oxygen plasma refers to any plasma treatment performed while introducing oxygen to the plasma chamber.

Various plasma generation methods and devices are appropriate for use in the method and system according to an embodiment. The plasma-generating systems and methods selected for use in association with the present disclosure may be sufficiently cool such that the generated radicals in the plasma do not heat the substrate beyond the temperature provided by the conveyor. By way of example, a plasma may be generated by subjecting a gas to a strong electromagnetic field to the point where the ionized gaseous substance becomes increasingly conductive.

As discussed above, the plasma gas may be one gas, or may be a mixture of gasses. In one embodiment, the mixture is selected to facilitate multiple different reactions with one or more selected precursors. In another embodiment, the mixture may be selected based on other reasons, for example availability, cost and safety. By way of example, when an oxygen plasma species is desired, a combination of oxygen and nitrogen may be used. In one embodiment, 0.5% to 10% oxygen is used in nitrogen. In another embodiment, 0.75% to 7.5% oxygen is used in nitrogen. In yet another embodiment, 1% to 5% oxygen is used in nitrogen. In yet another embodiment, 1.5% to 3% oxygen is used in nitrogen.

In one embodiment, the combination of gasses above is generated by using a premix gas. In another embodiment, the combination of gasses above is generated by having a plurality of separate gas sources which are combined prior to reaching the opening in the plasma source.

The selection of preferred plasma gas will be made based on the desired chemical reaction and resulting coating to be achieved. The flow rate and pressure of plasma will be determined by the size and shape of the plasma delivery. In one embodiment, the flow rate of the plasma gas out of the plasma source is in the range of from about 0.1 to about 10 slm. In another embodiment, the flow rate of the plasma gas out of the plasma source is in the range of from about 0.5 to about 8 slm. In another embodiment, the flow rate of the plasma gas out of the plasma source is in the range of from about 0.5 to about 6 slm. In another embodiment, the flow rate of the carrier gas with plasma out of the plasma source is in the range of from about 1 to about 4 slm. In another embodiment, the flow rate of the plasma gas out of the plasma source is in the range of from about 1.5 to about 3 slm. The flow rate may be influenced by the size of the delivery of the plasma. That is, a larger delivery of plasma may allow for a slower flow rate, and a smaller delivery of plasma will typically require a faster flow rate to achieve the same substrate coverage in a given time.

Figure 3A:
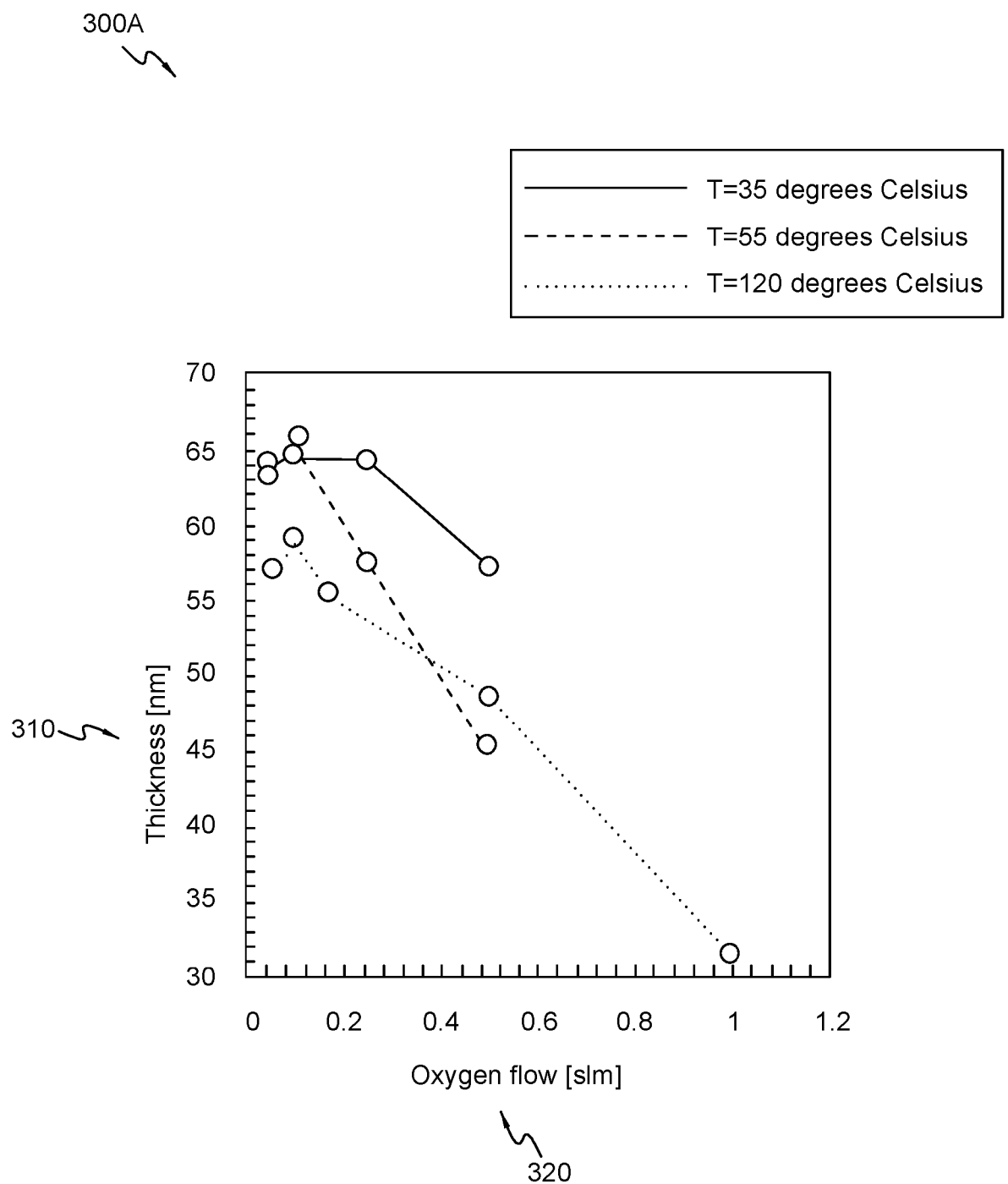
FIG. 3A is a graph illustrating thickness of deposited layers as a function of oxygen flow, according to an embodiment.
Figure 3B:
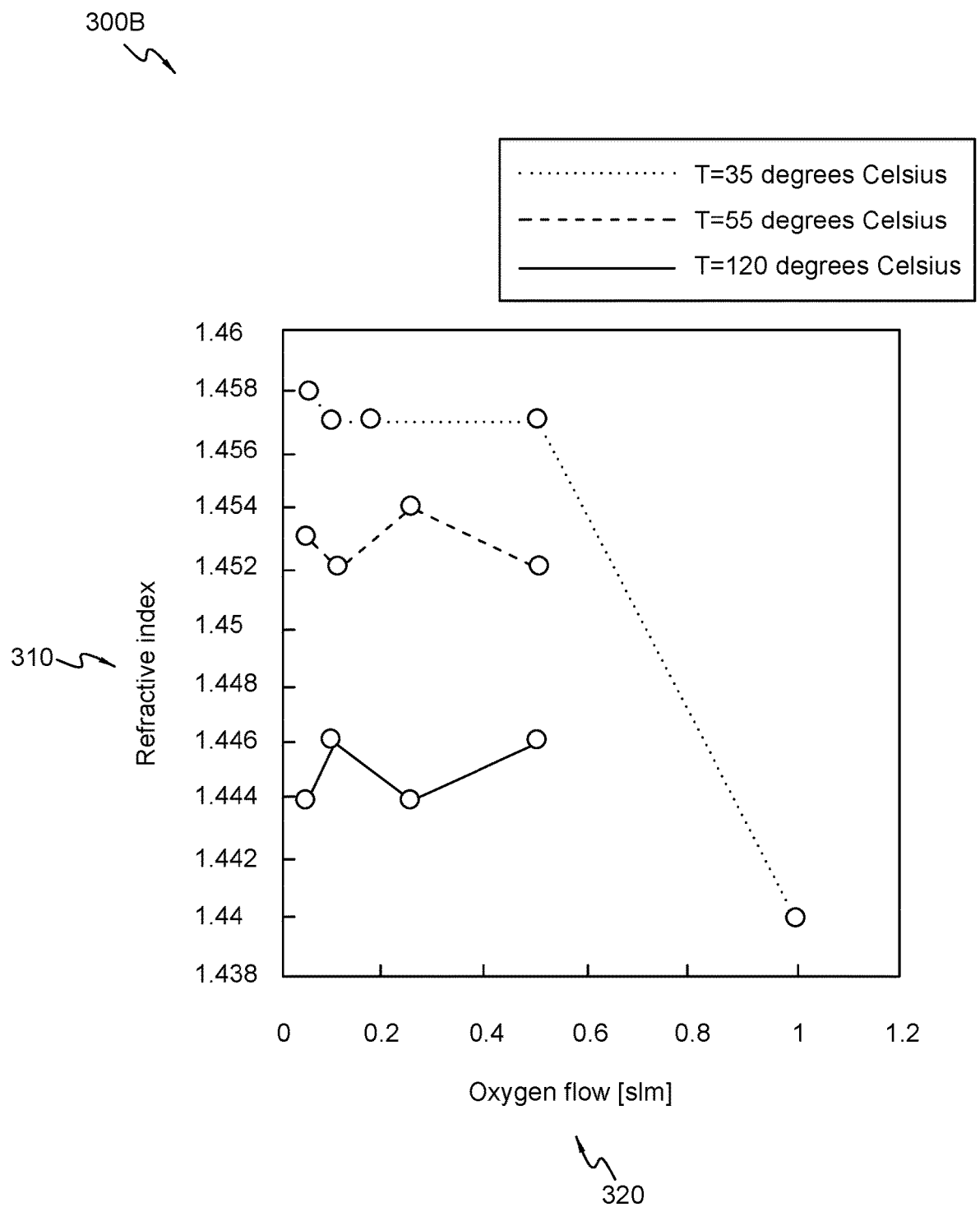
FIG. 3B is a graph illustrating refractive index of deposited layers as a function of oxygen flow, according to an embodiment.

FIG. 3A is a graph 300A illustrating thickness of deposited layers 310 as a function of oxygen flow 320, according to an embodiment and FIG. 3B is a graph 300B illustrating refractive index of deposited layers 330 as a function of oxygen flow 320, according to an embodiment. As can be seen from FIGS. 3A and 3B, the oxygen flow may affect the thickness and refractive index. In the embodiments illustrated in FIGS. 3A and 3B, total nitrogen curtain flow is 100 slm and oxygen flow is from zero to 1 slm. As can be seen in graph 300A, an oxygen flow of 1 slm, comprising less than 1% of total flow, results in a thickness of about 21 nm. In contrast, an oxygen flow of 0.2 slm results in a thickness of approximately 55-65 nm (depending on temperature). This demonstrates that the oxygen is more effective at lower concentrations. This was observed at three different temperatures. When the present invention is used to coat an IOL, the preference for lower oxygen flow is also reflected in the refractive index graph 300B. Specifically, the refractive index is relatively constant until the oxygen flow exceeds 0.5 slm. This was observed at three different temperatures.

Figure 4:
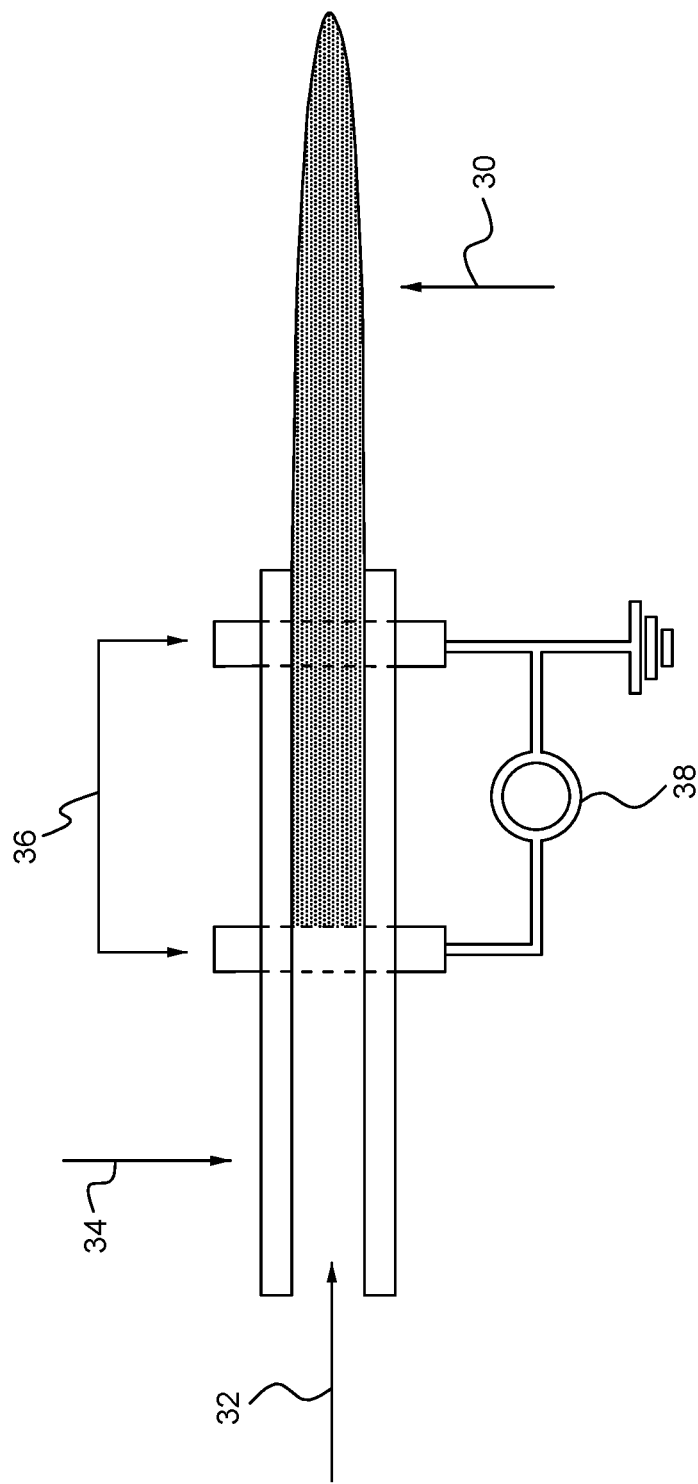
FIG. 4 is a diagram of a plasma source, according to an embodiment.

FIG. 4 is a diagram of a plasma source, according to an embodiment. In the embodiment illustrated in FIG. 4, a plasma jet 30 is generated when gas 32 is passed through a dielectric tube 34. This dielectric tube 34 is surrounded by two ring electrodes 36 which are connected to a power supply 38. To activate the plasma mechanism of FIG. 4, a high-frequency electric voltage difference is applied between first ring electrodes 36 by a generator.

Figure 5:
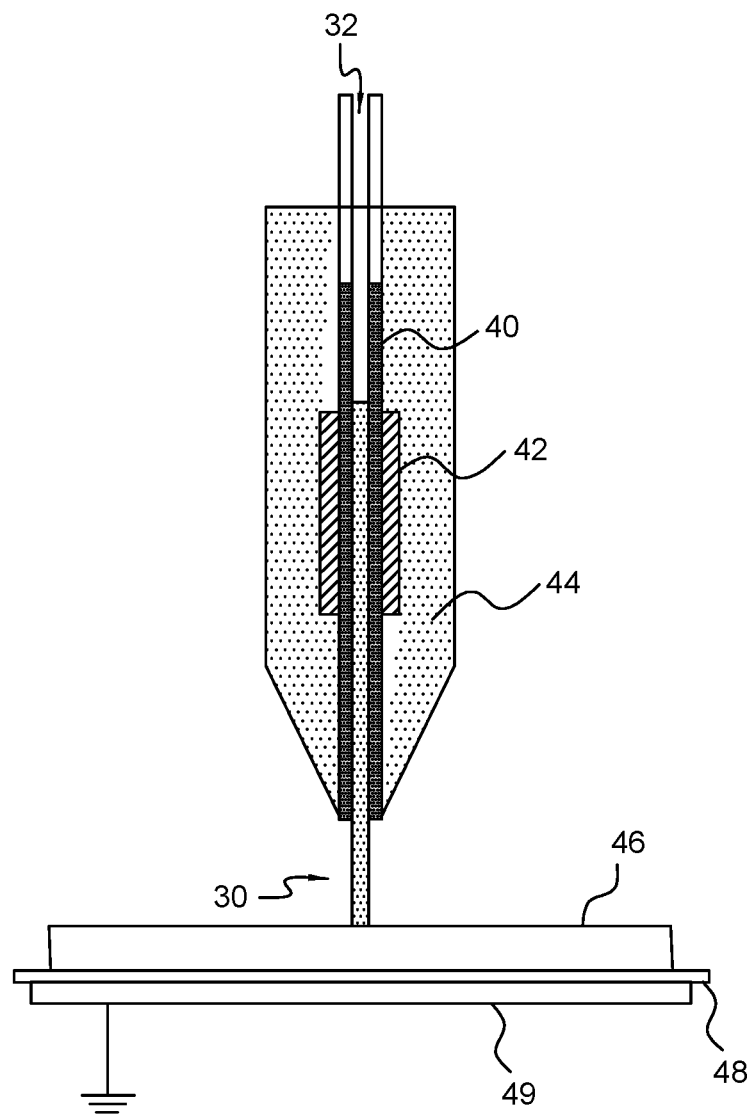
FIG. 5 is a diagram of a plasma source, according to another embodiment.

FIG. 5 is a diagram of a plasma source, according to another embodiment. In the embodiment illustrated in FIG. 5, a plasma jet 30 is generated when gas 32 is passed through a quartz glass tube 40. This glass tube 40 is surrounded by a high voltage electrode 42 which may be connected to a power supply (not shown). The glass tube 40 and electrode 42 may be surrounded by a ceramic body 44. Substrate 46 rests on a sample holder 48, which may be located on a grounding electrode 49. To activate the plasma mechanism of FIG. 5, a high-frequency electric voltage difference may be applied to high voltage electrode 42 by a generator.

Figure 6:
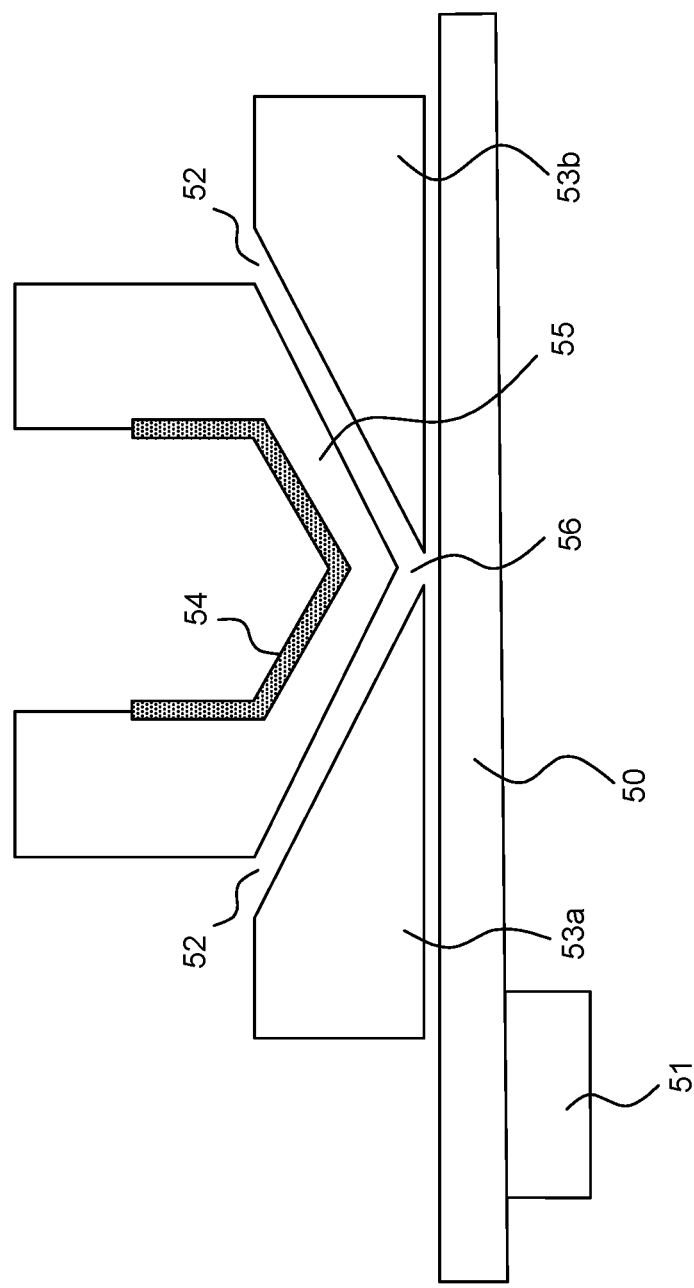
FIG. 6 is a diagram of a plasma source, according to yet another embodiment.

FIG. 6 is a diagram of a plasma source, according to yet another embodiment. This embodiment is disclosed in U.S. Publication No. 20170137939 (Creyghton et al.). In the embodiment illustrated in FIG. 6, a substrate 50 may be moved by transport mechanism 51 and fluid/gas inlets 52 may flow between a first electrode 53a and a second electrode 53b. In some embodiments, the first electrode 53a and the second electrode 53b may be comprised of electrically conductive material 54. In some embodiments, the first and second electrodes 53a, 53b may be coupled to an electric voltage generator. In some embodiments, the electrically conductive material 54 may include a dielectric layer 55. In further embodiments, the dielectric layer 55 may be aluminum oxide or silicon carbide.

The embodiment illustrated in FIG. 6 further includes an aperture 56, through which the generated radicals in the plasma do flow to reach substrate 50. In some embodiments, first electrode 53a, second electrode 53b and dielectric layer 55 extend at least along the length of aperture 56, which extends perpendicular to the plane of the figure. That is, the aperture 56 may take the form of a slot through which plasma is provided.

To activate the plasma mechanism shown in FIG. 6, a high-frequency electric voltage difference may be applied between the first electrode 53a and the second electrode 53b by the generator (not shown). The first electrode 53a may be kept at a constant potential (e.g. ground potential). A higher frequency potential may be applied to second electrode 53b. The combination of first and second electrodes 53a, 53b, and the dielectric layer 55 may function as a dielectric barrier discharge or surface dielectric barrier discharge plasma generator. Gas may flow from inlets 52 to aperture 56 through the spaces between the lower surface of dielectric layer 55 and the upper surfaces of the first electrode 53a and the second electrode 53b.

The high-frequency electric field in these spaces resulting from the voltage differences may ionize the gas, creating plasma. The ionized gas may flow into aperture 56 where it forms an atmospheric plasma, i.e. a plasma in a gas of considerable pressure.

In some embodiments, the plasma area is equipped with at least one exhaust through which the generated radicals in the plasma may exit. In the embodiment illustrated in FIG. 2, the plasma area may be equipped with two exhausts (not shown), one on one side of the holder 14 that is generally in the path of the movement of the holder 14 and one on the other side of the holder 14 that is generally in the path of the movement of the holder 14. In yet another embodiment, the plasma area is equipped with two exhausts (not shown), one on one side of the holder 14 that is approximately perpendicular to the relative movement of the holder 14 and one on the other side of the holder 14 that is approximately perpendicular to the relative movement of the holder 14. Example exhausts 7 are shown in FIG. 1.

In one embodiment, the distance from the plasma source to the substrate is from about 1 mm to about 5 mm. In another embodiment, the distance from the plasma source to the substrate is from about 2 mm to about 5 mm. In another embodiment, the distance from the plasma source to the substrate is from about 3 mm to about 5 mm. In another embodiment, the distance from the plasma source to the substrate is about 4 to about 5 mm. In another aspect of the invention, the distance from the plasma source to the substrate is about 4 mm. The effectiveness of specific distances from the plasma source to the substrate will be shown by measuring the GPC as a function of the process gap. GPC may be defined as the incremental increase in the thickness of the film per cycle of deposition. The effectiveness of comparatively large distances would be exemplified by prophetic results similar to those shown below in Table 1, which illustrate that the GPC of large process distances (e.g., about 3 mm to about 5 mm) fall within an acceptable range.

TABLE 1

| Distance From Plasma Source to Substrate (mm) | GPC (nm/cycle) |
|---|---|
| 1 | 0.140 |
| 2 | 0.120 |
| 3 | 0.150 |
| 4 | 0.080 |
| 5 | 0.060 |

Figure 7:
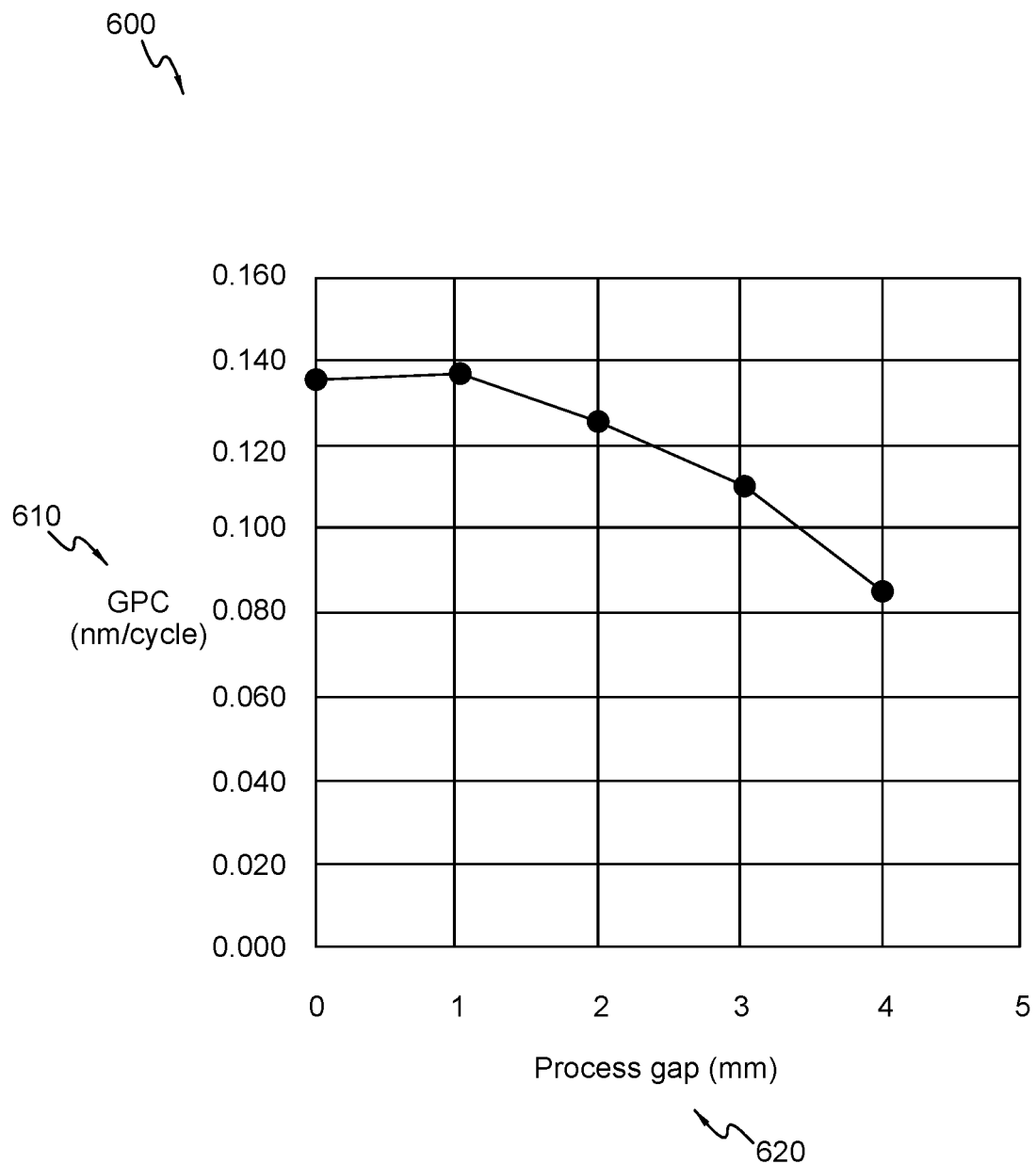
FIG. 7 is a graph of growth per cycle (GPC) as function of the process gap, according to an embodiment.

FIG. 7 is a graph 600 of GPC 610 as function of the process gap 620 (i.e., the distance between the injector head and substrate holder), according to an embodiment. As shown in FIG. 7, the GPC of a process gap of about 4 mm was shown to be effective. The effectiveness of comparatively large spacing between the (a) opening in the precursor source and the substrate and (b) the plasma source and the substrate, such as the 4 mm spacing, was unexpected, as many in the industry believe that the surface of the product would need to be close to the s-ALD heads in order to facilitate an efficient gas separation by the purge area. As one of skill in the art would appreciate, a greater gas flow and/or concentration may be used to compensate for a larger process gap. By having a comparatively large spacing, a lens may be retained in the device used during the formation of the lens and does not have to be demolded prior to coating. Further, the configuration of the embodiment does not significantly adversely impact the gas separation of the slots.

In use, the substrate holder is placed on a conveyor 5 (see FIG. 1) in the s-ALD system. The system may be arranged for relative motion between the conveyor and the precursor/ purge/plasma sources. This relative motion is achieved without varying the distance between the conveyor 5 and the precursor/purge/plasma sources; the movement is planar. In one embodiment, the conveyor 5 moves past stationary precursor/purge/plasma sources. In another embodiment, the conveyor 5 is stationary and positioned within a system where the precursor/purge/plasma sources are in motion and move past the substrate. In yet another embodiment, both the conveyor 5 and the precursor/purge/plasma sources move with respect to each other. In another embodiment, the conveyor and the precursor/purge/plasma source movement may be characterized as reciprocating.

As will be appreciated by one having ordinary skill in the art, movement may be achieved by many different means. For example, in one embodiment, movement may be achieved through the use of a conveyor belt or a table and a motor to drive the table. In other embodiments, the transport mechanism may comprise a motor to move the substrate through the system, or vice versa.

The present disclosure addresses the problem of self-tackiness and long, unpredictable unfold times by applying a thin anti-tack coating to the anterior surface of the lens using s-ALD. In some embodiments, the thin anti-tack coating is applied to the anterior surface of the lens and the surfaces of the one or more support members using s-ALD. In some embodiments, the anterior side of the lens and all surfaces of the lens support structures are coated with this thin layer of layer. In some embodiments, the anterior side of the lens and substantially all surfaces of the lens support structures are coated with this thin layer. The coating may selected based on its anti-tack properties, its ability to chemically bond to the substrate, and/or its refractive index. As noted above, while the refractive index of the coating does not have to exactly match the substrate, it may be selected so that the difference between refractive index of the coating and the refractive index of the substrate do not unduly cause reflections or negative optical outcomes for a patient.

In some embodiments, it may be desired to design a coating with specifically tailored properties. When the refractive index of the coating matches the refractive index of the lens material there will be no impact to the optical properties. When the refractive index is chosen between the reactive index of the aqueous and the lens material, the angle of total refraction will increase as the difference of the refractive index at every transition is lower. Thus, the reflection may be reduced. This is of particular importance for intraocular lenses with a high refractive index and discontinuous features such as diffractive patterns.

By way of example, a practitioner may desire to have a non-tack coating with a specific refractive index. In such instances, it may be desirable to provide a coating which is comprised of alternating layers of different compounds. Such alternating does not have to be 1:1; it may be 1:3, 1:4, 1:5, 1:6, 1:7, 1:8, 1:9, 1:10, 1:1, 1:12, 1:13, 1:14, 1:15 and so forth. In another embodiment, the alternating may be 1:2:1, 1:3:1, etc. In an embodiment, one compound may form the base of the coating while another forms the top layer of the coating. As may be seen, the possible varieties in organization of layers is almost limitless, and all possibilities are considered appropriate for use. The above anticipates two potential coating compounds. In one embodiment, three different coating compounds are layered into the lens coating. Layering multiple coatings with different refractive indexes to establish a gradient refractive index in the surface coating will further reduce reflection. In one embodiment, four different coating compounds are layered into the lens coating. In one embodiment, five or more different coating compounds are layered into the lens coating.

It may be desired to design a coating with specifically tailored properties by combining different precursor gasses in different molar ratios so that they are delivered by the same precursor head. In such instances, the relative ratio between the gasses may be, for example, in the range between 1:100 and 100:1. In other embodiments, three or more different precursor gasses may be combined in different molar ratios so that they are delivered by the same precursor head. The precursor gasses are combined before they are delivered by the precursor head. By way of example, and not of limitation, such combining may be performed in the channel leading up to the precursor source. In this embodiment, the relative ratio among the gasses may be selected by the practitioner based on the desired properties of the resulting coating.

The coating may be applied in a layer that is sufficiently thick to avoid tackiness issues, yet thin enough to avoid unduly interfering with the optics of the lens. In one embodiment, the layer is in the range of about 0.5 nm to about 25 nm. In another embodiment, the layer is in the range of about 0.75 nm to about 20 nm. In another embodiment, the layer is in the range of about 1 nm to about 15 nm. In another embodiment, the layer is in the range of about 1.5 to about 12.5 nm. In another embodiment, the layer is in the range of about 2 to about 11 nm. In another embodiment, the layer is in the range of about 5 to about 11 nm. Currently, s-ALD is the only technology that can place an anti-tack coating in these thicknesses, atomic layer by atomic layer.

In some embodiments, the thin anti-tack coating is applied in a layer that is sufficiently thick to avoid tackiness issues, yet thin enough to avoid unduly interfering with the optics of the lens. In one embodiment, the anti-tack coating is a $SiO_2$ layer. In one embodiment, this layer is in the range of about 0.5 nm to about 10 nm. In another embodiment, the $SiO_2$ layer is in the range of about 0.75 nm to about 8 nm. In another embodiment, the $SiO_2$ layer is in the range of about 1 nm to about 6 nm. In another embodiment, the $SiO_2$ layer is in the range of about 1.5 to about 2.5 nm. In another embodiment, the $SiO_2$ layer is in the range of about 2 to about 5 nm. In an embodiment where the $SiO_2$ layer is 4 nm, a 100% unfold yield was observed. A $SiO_2$ layer of 4 nm resulted in a thickness on a product of 1 nm.

For delivery by the precursor source, the selected precursor is first evaporated, and then the fumes are carried to the precursor source. In one embodiment, the selected precursor is first evaporated, and then the fumes are carried by a neutral carrier gas to the precursor source. It will be appreciated by one of ordinary skill in the art that it is important that the neutral carrier gas not react in an undesired manner with the precursor. The neutral carrier gas may also not contain any impurities that would react in an undesired manner with the precursor. In one embodiment, the carrier gas is nitrogen. In another embodiment, the neutral carrier gas is very pure nitrogen, with only a ppb level of moisture. The vapor pressure of the precursor determines how much precursor vapor can be carried with the carrier gas flow. In one embodiment, the pressure of the carrier gas plus precursor gas is approximately 1 atmosphere.

In one embodiment, the flow rate of the carrier gas with precursor out of the precursor source is in the range of from about 0.5 to about 8 slm. In another embodiment, the flow rate of the carrier gas with precursor out of the precursor source is in the range of from about 0.75 to about 6 slm. In another embodiment, the flow rate of the carrier gas with precursor out of the precursor source is in the range of from about 1 to about 4 slm. It will be appreciated by one of skill in the art that the flow rate will be influenced by the size of the delivery of the precursor. That is, a larger opening will require a slower flow rate, and a smaller opening will typically require a faster flow rate to achieve the same substrate coverage in a given time.

In an embodiment where the anti-tack coating is $SiO_2$, the precursor may be selected from any of those known in the art. By way of example, and not of limitation, the precursor may be selected from one of the following: bis(diethylamino) silane (CAS No.: 27804-64-4) (BDEAS); tris(dimethylamino) silane (CAS No.: 15112-89-7) (TDMAS, or 3DMAS), di(isopropylamino) silane (CAS No.: 908831-34-5) (DIPAS), tetraethyl orthosilicate (CAS No. 78-10-4) (TEOS), hexamethyldisiloxane (CAS No. 107-46-0) (HMDSO), tri-Chloro-Silane (CAS No. 2550 Jun. 3) (TCS), or benzyltrimethylsilane (CAS No.: 770-09-2) (BTMAS), or a combination thereof. In one embodiment, the precursor is selected from BDEAS.

In an embodiment where the anti-tack coating is aluminum oxide, the precursor may be selected from any of those known in the art. By way of example, and not of limitation, the precursor may comprise from one of the following: aluminum bromide (CAS No.: 1309-64-4), aluminum trichloride (CAS No.: 7446-70-0), trimethyl-aluminum (CAS No.: 75-24-1), or trimethylamine alane (CAS No. 16842-00-5), aluminum tri-sec-butoxide (CAS No. 2269-22-9), or a combination thereof.

In an embodiment where the anti-tack coating is titanium oxide ($TiO_2$), the precursor may be selected from any of those known in the art. By way of example, and not of limitation, the precursor may comprise one of the following: tetrakis(dimethylamino)titanium(IV) (CAS No. 3275-24-9) (TDMAT), titanium tetrachloride (CAS No.) (TiCl4), and titanium tetraisopropoxide (CAS No. 546-68-9) (TTIP), or a combination thereof.

In some situations, the precursor may be a fluid. In such instances, the fluid may be held in a container. In one embodiment, the container is stainless steel, aluminum, or another material which does not react with the precursor. In another embodiment, the container is glass. In either embodiment, the container may be placed in a temperature-controlled bath, with the temperature selected to generate the appropriate amount of vapor from the fluid precursor. The amount of vapor is the then determined by the temperature of the precursor and the pick-up flow. A further dilution flow of inert gas may be added to the precursor flow, if desired.

In an embodiment, a coating may be designed with specific chemical or physical properties. In such an embodiment, depending on the desired chemical or physical properties, more than one molecule may be used to form the coating. In an embodiment, one or more of the coatings described herein are layered together to form a coating. In an alternate embodiment, one or more precursors identified herein are delivered together from one precursor head to provide a coating layer that is composed of more than one molecule.

The concentration of the precursor gas is preferably chosen to be slightly above a minimum concentration needed for atomic layer deposition. This improves efficiency of the system, and reduces the number of cycles which are required to achieve a desired coating thickness.

As described, some of the above precursors are particularly suited to providing an oxide coating when exposed to oxygen plasma. In one embodiment, instead of an oxide coating, a nitride or carbide coating is selected. For nitrides, nitrogen plasma would be used. For carbides, carbon monoxide or carbon dioxide plasma may be used. In one embodiment, nitric oxygen is used. This gas may be used either for its oxygen or nitrogen radicals, depending on precursor reactivity.

Such coating may be used, for example, on an acrylic lens or other lens having a similar refractive index. As one of ordinary skill in the art will appreciate, other coatings and other precursors may also be appropriate-either for acrylic lenses, or lenses made from other materials. A person having ordinary skill in the art, knowing the chemical makeup of the lens they are seeking to coat, and the properties of the coating they are seeking to generate will be able to select appropriate precursors that may not be included in the list above. Factors to be considered may include the deposition temperature and the thickness of the layer which is required to achieve a desired effect. In some embodiments, the deposition temperature may be room temperature. As noted above, in some embodiments, a thinner coating is preferred over a thicker coating.

The area where the precursor is applied may be equipped with at least one exhaust through which the precursor may exit. In one embodiment, the precursor area is equipped with two exhausts, one on one side of the holder 14 that is in the path of the movement of the holder 14 and one on the other side of the holder 14 that is generally in the path of the movement of the holder 14. In another embodiment, the precursor area is equipped with two exhausts, one on one side of the holder 14 that is approximately perpendicular to the relative movement of the holder 14 and one on the other side of the holder 14 that is approximately perpendicular to the relative movement of the holder 14.

As noted above, the area where the precursor is applied may be followed by a purge area. This area serves as a flow barrier to halt access of the precursor material to the substrate. In practice, the purge area may comprise a source of inert gas. In one embodiment, the purge area comprises a source of nitrogen gas. The purge area may be equipped with at least one exhaust through which the nitrogen and any other gasses may exit. In one embodiment, the purge area is equipped with two exhausts, one on one side of the holder 14 that is generally in the path of the movement of the holder 14 and one on the other side of the holder 14 that is generally in the path of the movement of the holder 14. In yet another embodiment, the purge area is equipped with two exhausts, one on one side of the holder 14 that is approximately perpendicular to the relative movement of the holder 14 and one on the other side of the holder 14 that is approximately perpendicular to the relative movement of the holder 14.

As noted above, the area where the plasma is applied may be followed by a purge area. This area may serve as a flow barrier to halt access of the plasma to the substrate. In practice, the purge area may comprise a source of inert gas. In one embodiment, the purge area may comprise a source of nitrogen gas.

The number of lenses which may be processed at one time and the length of the tunnel (number of repeating purge, precursor, and plasma units) may be based on the desired thickness of the coating, the flow rate of the precursors, temperature, spacing between the substrate head or the plasma source and the substrate, and potential pre-treatment of the lenses. The final configuration may be determined by experimentation varying these factors.

In order to encourage the required chemical reactions, heat is required. In one embodiment, this is applied through the conveyor 5 (see FIG. 1). In an alternate embodiment, the heat is provided by placing the s-ALD system in a heated chamber. In another embodiment, heat lamps and/or electrical heating rods may be used. Desirable temperatures are in the range of about 25° C. to about 90° C. In another embodiment, the temperature is in the range of 30° C. to about 70° C. In another embodiment, the temperature is in the range of 30° C. to about 55° C. In another embodiment, the temperature is in the range of 32° C. to about 55° C. In another embodiment, the temperature is in the range of 30° C. to about 40° C. Selection of the temperature will be determined based on the amount of heat that is desired to encourage the required chemical reactions. As will be appreciated, it may be desirable to select a temperature that, over the time it is provided, does not have any measurable impact on the chemistry of the substrate There may be minimal spacing between the lens holders as they progress through the s-ALD pathway. Smaller gaps between the lens holders may reduce the likelihood of leakages and help to ensure sufficient separation between the gasses. It may also reduce the amount of dead volume being processed, which increases throughput.

As may be envisioned, this simplified process to apply a useful coating may be made part of a line of automated molding and demolding, lens inspection, and surface treatment. The footprint of the surface treatment portion of such automated system may be compact. By way of example, the entire system may be able to fit within one room.

A variety of s-ALD configurations are considered within the range of the present disclosure. It will be understood that s-ALD may can be set up in a broad variety of configurations. Embodiments in accordance with the foregoing disclosure, which should not be considered limiting, will now be described in detail in the following Examples.

Example 1: Tunnel Concept

This Example demonstrates one manner in which surface modification may be accomplished. In this concept, the lenses to be coated travel in holders down a straight path. This may be configured as one column of lenses, or a plurality of columns of lenses in parallel process. In one embodiment, up to 25 lens/lens holders may be processed in parallel process using a tunnel configuration. In an alternate embodiment, from 1-15 lens/lens holders may be processed in parallel process.

Continual processing may be performed where the lenses are arranged in a column, that is, when one lens follows the other. Continual processing may also be arranged in parallel, where multiple lenses proceed through the system concurrently. In one embodiment of the system, lenses proceed both in a column and in parallel. This allows for maximum throughput.

As noted above, FIG. 1 is one example of a portion of a s-ALD according to one embodiment. As may be seen, the line is first purged of atmosphere. The substrate then passes through a precursor area, then through a purge area, then through an area where it is exposed to plasma, and then through another purge area. The openings in the precursor source, the inert gas source and the plasma source were all slot-like in configuration, with the slot spanning substantially the fill width of the substrate holder. The pathway through precursors and plasma areas, separated by purge areas may be repeated until the desired coating thickness is reached. The substrate may then pass through one last purge area. In this embodiment, the plasma is oxygen radicals produced by 2% oxygen in nitrogen the precursor is BDEAS. The vapor pressure of the nitrogen carrier gas and BDEAS precursor was approximately 1 atm. That is, the vapor pressure of BDEAS is lower than 1 atm, but the pressure of the pickup and carrier flow is 1 atm. The flow rate used was 2 slm. All lenses were located 4 mm below the opening in the precursor source, the inert gas source and the plasma source when they were being treated.

Figure 8A:
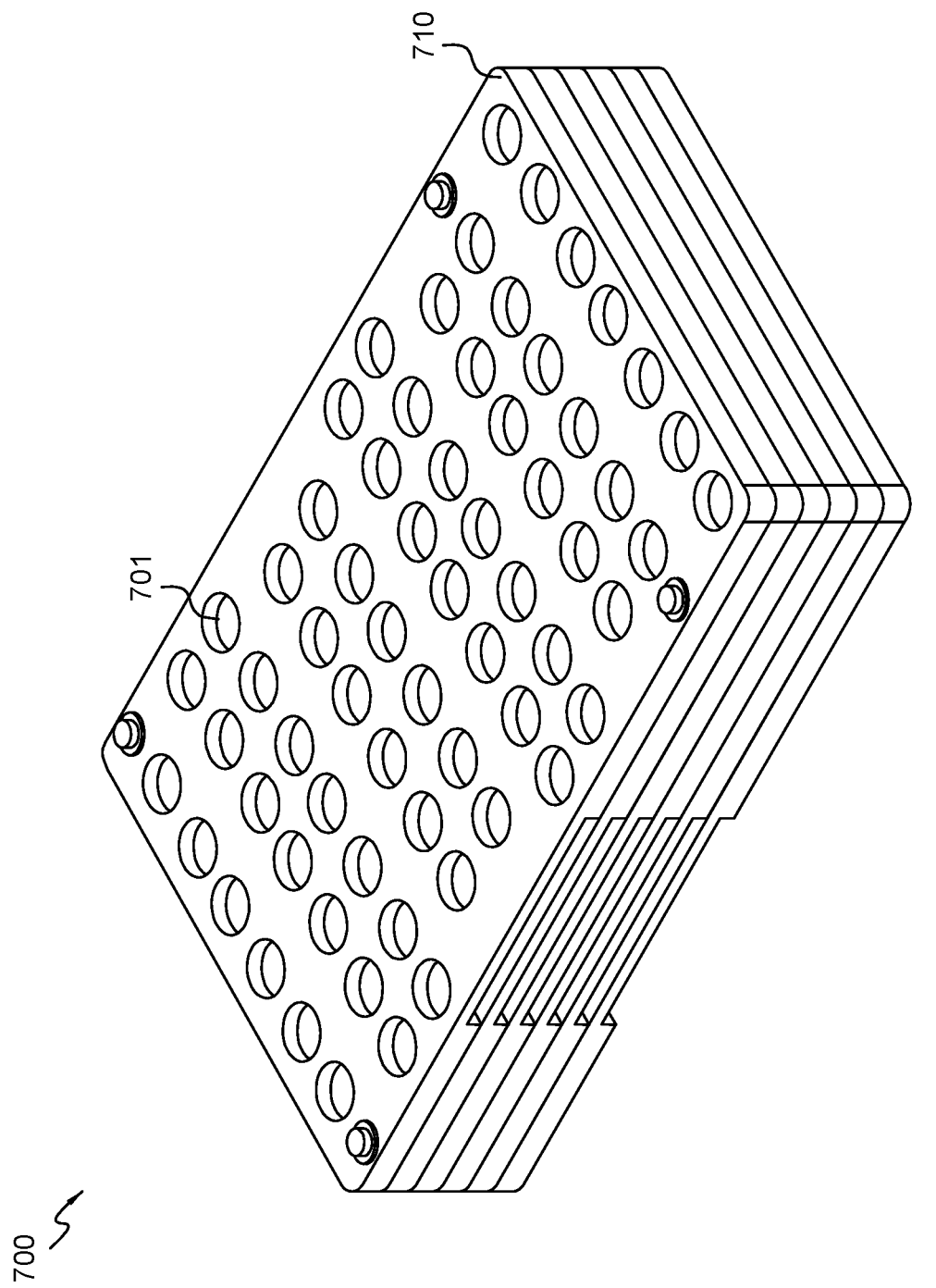
FIG. 8A is a perspective view of a stack of product trays, according to an embodiment.
Figure 8B:
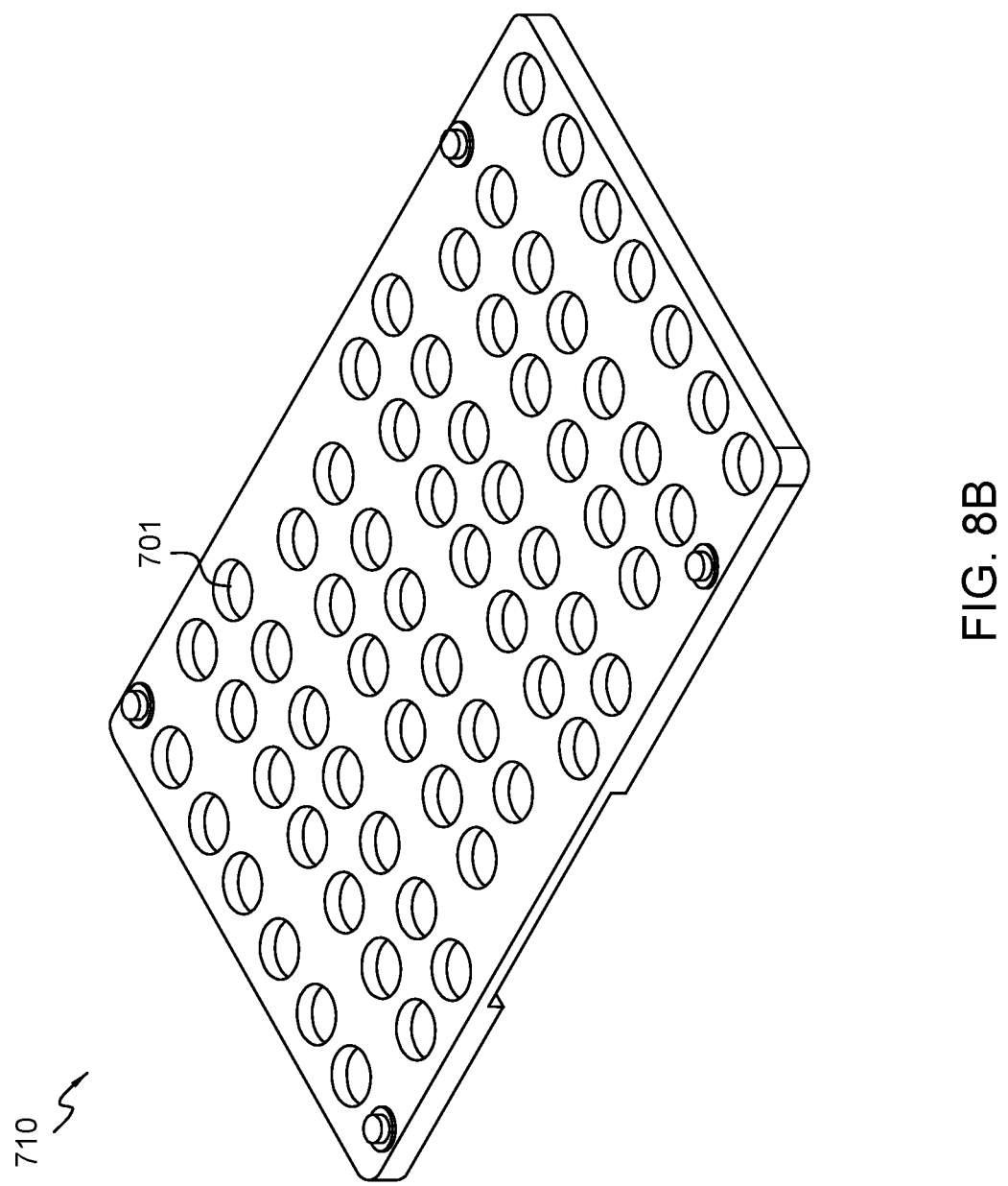
FIG. 8B is a perspective view a single product tray of FIG. 8A, according to an embodiment.

FIG. 8A is a perspective view of a stack 700 of a plurality of product trays 710, according to an embodiment, and FIG. 8B is a perspective view a single product tray 710 of the stack 700 of FIG. 8A, according to an embodiment. A single product tray 710 may hold lenses as the product tray 710 moves through the s-ALD system. In some embodiments, product tray 710 is designed to be used only once (i.e., to be expendable). The expendability of product tray 710 may be advantageous, as permanent product trays are susceptible to debris build-up and flaking.

Each product tray 710 may comprise a plurality of depressions 701 configured to hold lenses. In one embodiment, the depressions 701 may be arranged in a linear fashion. However, the depressions 701 may be configured in various other arrangements suitable for use in the system of the present disclosure. In some embodiments, the depressions 701 are adjacent to each other. In other embodiments, the depressions 701 are separated by a distance.

Figure 8C:
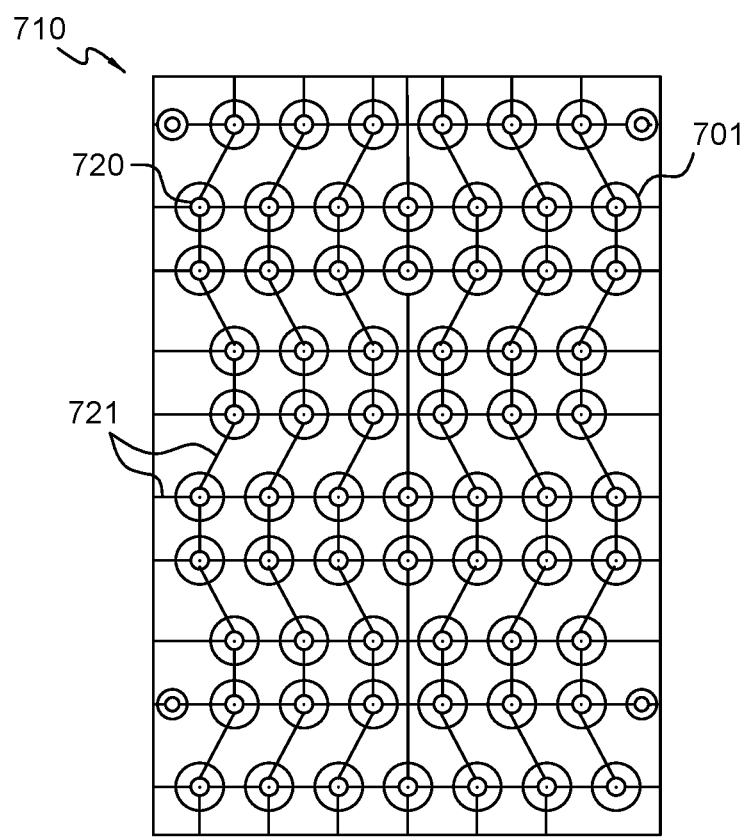
FIG. 8C is a plan view of a single product tray with masking elements.

FIG. 8C is a plan view of the product tray 710 with a masking device in which a plurality of masking elements 720 joined together by a plurality of structural members 721 are used to at least partially mask the lens body while allowing a portion of the support structure that is located away from the lens body to receive a coating along substantially its entire circumferential surface. Referring to FIG. 2, in some embodiments, the masking elements 720 may extend beyond the process gap 6 and into the interior 15 of the substrate holder. Such masking elements 720 may be designed in a concave fashion such that they partially or substantially fit over the upper lens surface. The masking elements 720 may be somewhat inflexible, and/or they may be equipped with a sealing portion to improve the masking efficiency. Such a mask may be desired from a functionality/desired coating area perspective. For example, for some materials, it may be preferred to coat only a portion of the finished product. Such a mask may be desirable from an efficiency perspective in that the one mask may be used to cover multiple lenses in a tray.

The mask would also allow for coating without significantly handling the lens. A reduction in required handling steps typically results in fewer inadvertent manufacturing defects.

Figure 9:
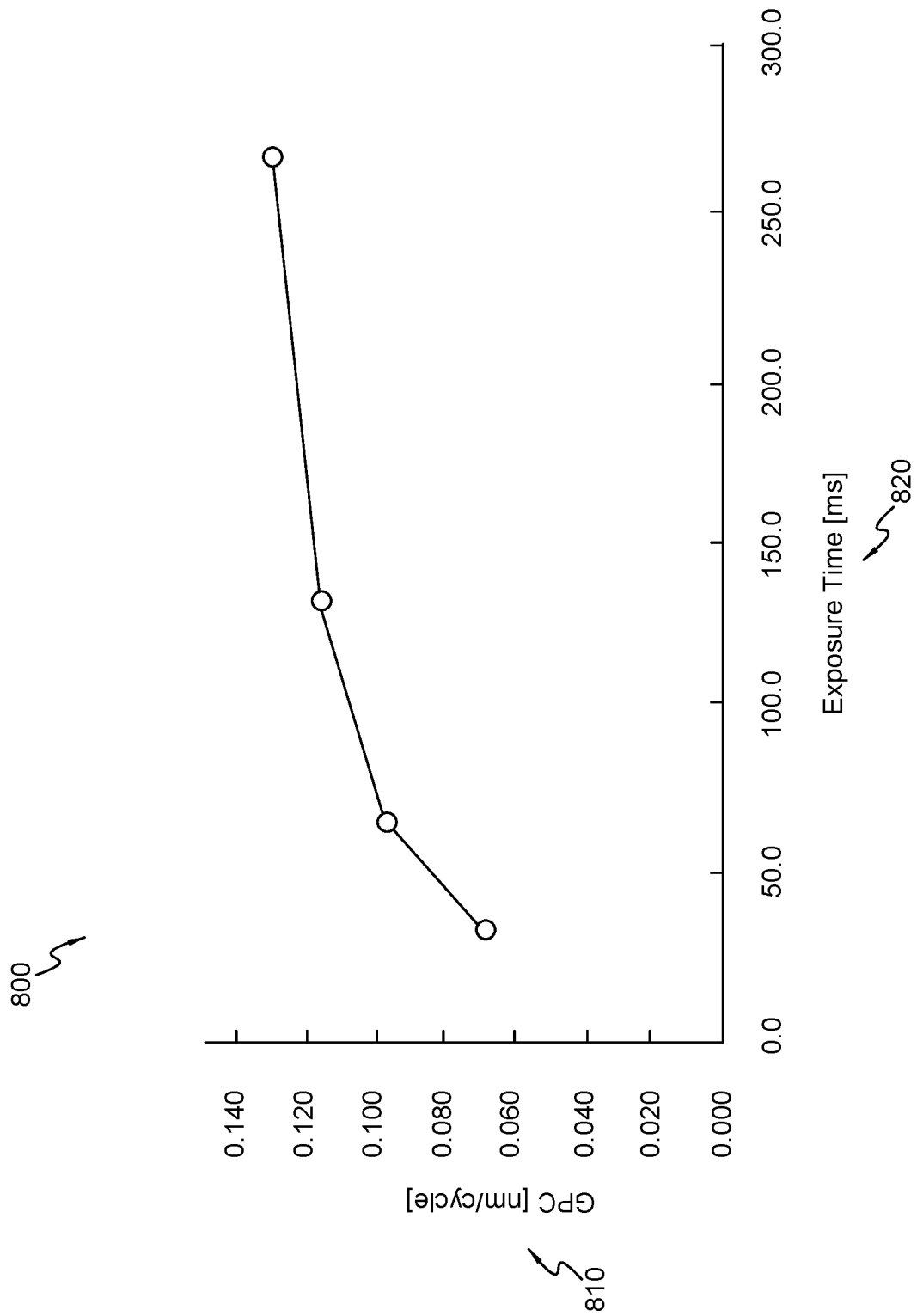
FIG. 9 is a graph illustrating the Growth Per Cycle of $SiO_2$, according to an embodiment.

FIG. 9 is a graph 800 illustrating the Growth Per Cycle of $SiO_2$ 810 as a function of time 820. In this system, the precursor slot length was 70 mm and the average precursor exposure time was 275 ms. For the plasma, a gas a mixture of oxygen and nitrogen, (2% oxygen), was used. The plasma exposure was 62 mm/s substrate speed. Plasma pressure was approximately 1 atm, and the flow was 2 slm. After 15 cycles (purge/precursor/purge/plasma), a 2 nm coating of $SiO_2$ was deposited on the lenses. The coated lenses were compressed and passed through a lens insertion system.

Figure 10:
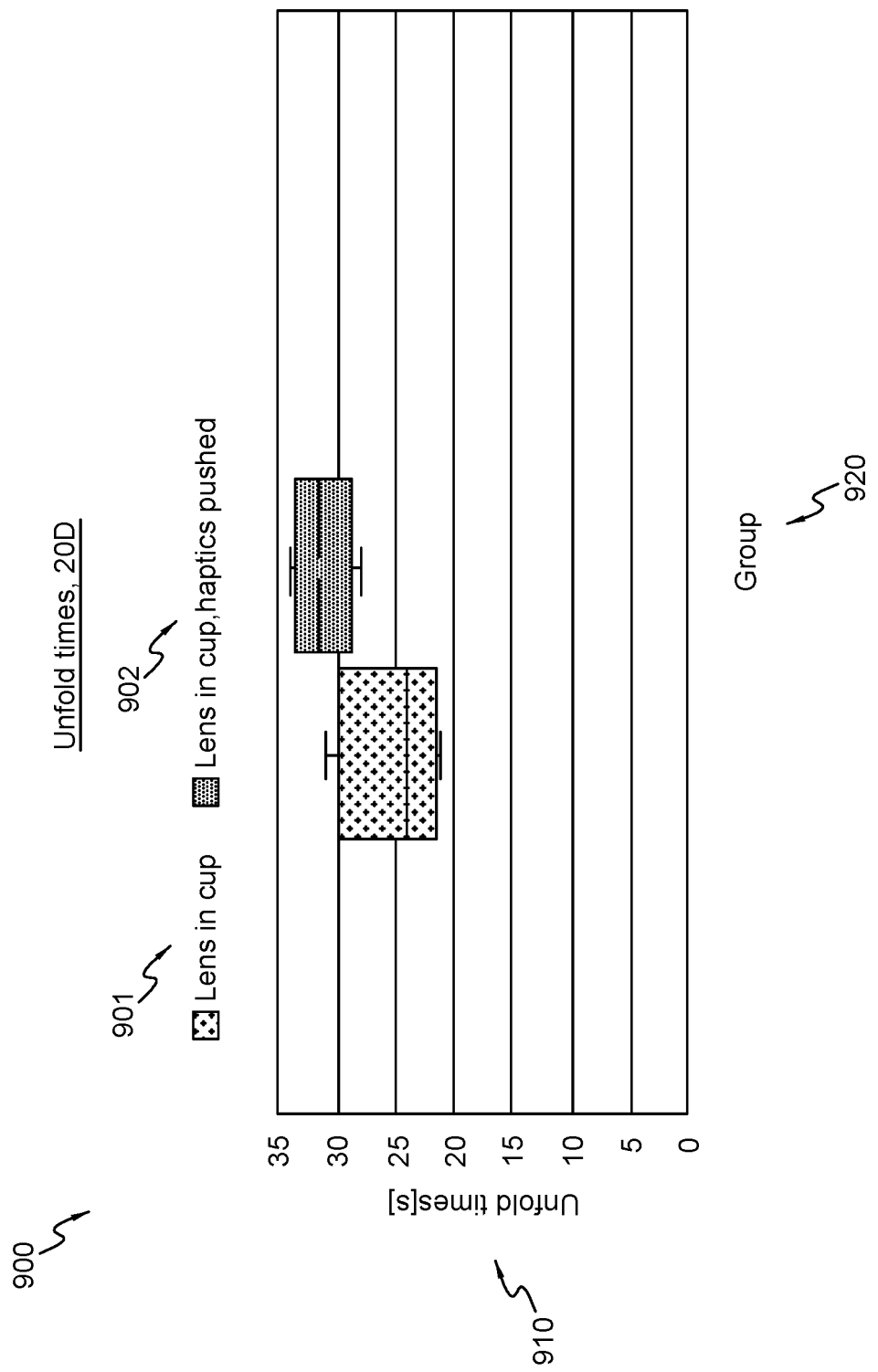
FIG. 10 is a graph illustrating comparative data for coated lenses, according to an embodiment.

FIG. 10 illustrates comparative data for coated lenses 900. The y-axis 910 represents the unfold times in seconds and the x-axis represents the group types 920. In FIG. 10, lens in cup 901 refers to molded lenses, with haptics (i.e., any of a variety of support structures for positioning an IOL in an eye), where the top portion of the lens mold has been removed and the lens and haptics are retained in the bottom portion of the mold. Lens in cup, haptics pushed 902 refers to molded lenses where the top portion of the lens mold has been removed and the distal ends of the haptics (i.e., any of a variety of support structures for positioning an IOL in an eye) have been pushed out of the mold, so that the lens and a portion of the haptics are retained in the bottom portion of the mold. Both lens types (lens in cup 901 and lens in cup, haptics pushed 902) proceeded through the s-ALD system at a distance of 4 mm from the openings in the precursor source, the inert gas source and the plasma source.

As may be seen in FIG. 10, both lens types coated in accordance with the present invention had an average unfold time in the acceptable range of less than 60 seconds. As may be seen, both lens types had an average unfold time of less than 35 seconds.

The lens in cup lenses 901 had an average unfold time of 25.4 seconds, with a yield of 56%. The lens in cup, haptics pushed lenses 902 had an average unfold time of 31.125 seconds, with an 89% yield. Further, as shown by the yields of the two groups of lenses, the consistency of unfold time increased as a larger percentage of the lens and haptic surfaces were coated. In this experiment, a reduced yield means that the lens failed to unfold in less than 60 seconds. By adding a coating of consistent thickness, both unfold time and consistency in unfold time, both of which are key parameters for ophthalmic surgery, were improved.

These unfold times may be contrasted with uncoated lenses (not shown), which all had unfold times outside of the acceptable range of less than 60 seconds.

Therefore, the s-ALD system of the present disclosure provides desirable unfold times, without substantially increasing the per-unit cost of the molded lenses.

Example 2: Circular s-ALD System

This Example demonstrates an alternate manner in which surface modification may be accomplished. In this embodiment, a plurality of substrates to be coated are provided on a circular base. The purge, plasma and precursor areas are spaced around the circle in what can be considered pie wedges which make up the full circle.

Figure 11:
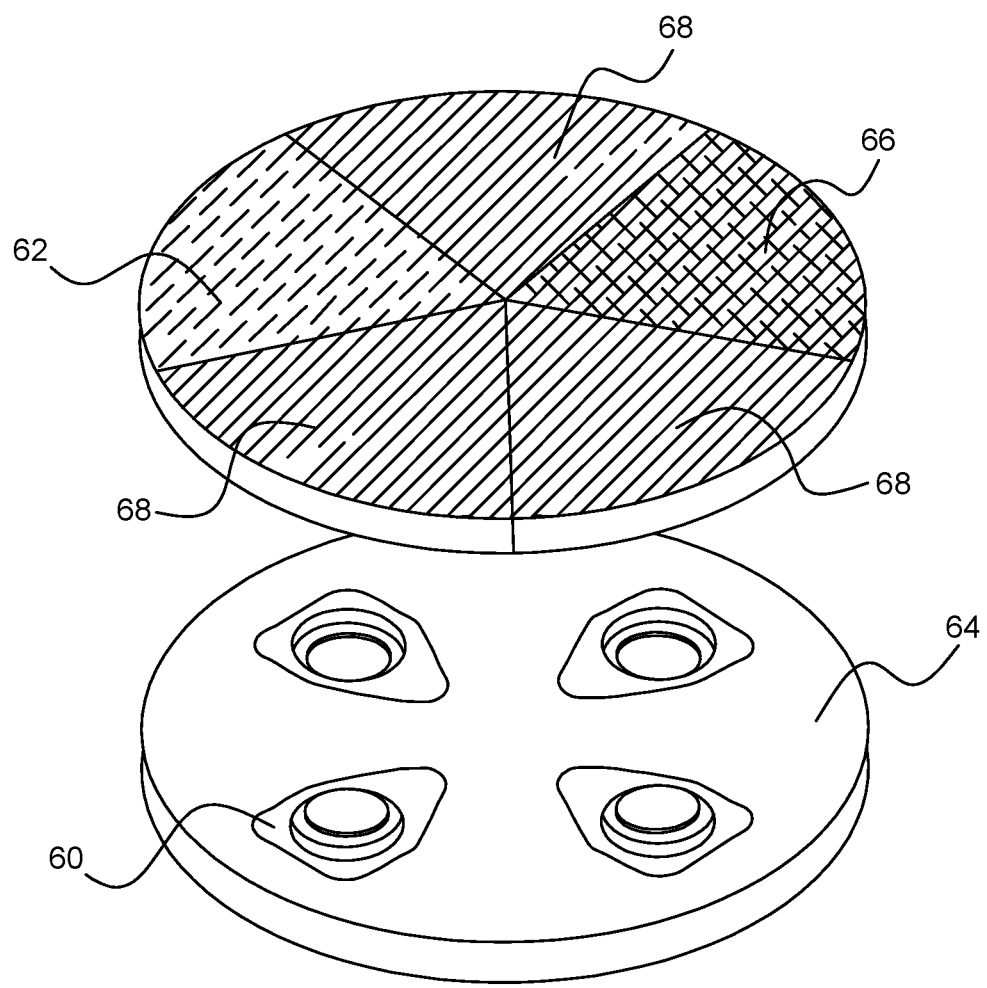
FIG. 11 is a perspective, exploded view of a rotary Spatial Atomic Layer Deposition (s-ALD) system, according to an embodiment.

FIG. 11 provides a perspective view of a circular, or rotary, s-ALD system according to one embodiment. Each pie-shaped piece in the top section may be viewed as either a precursor source 62 area, an inert gas source 68 area (also known as a purge area) or a plasma source 66 area. For convenience, this general view shows only one precursor source 62 area and one plasma source 66 area. Circular holder 64 with a plurality of substrate holders 60 are also shown.

Figure 12:
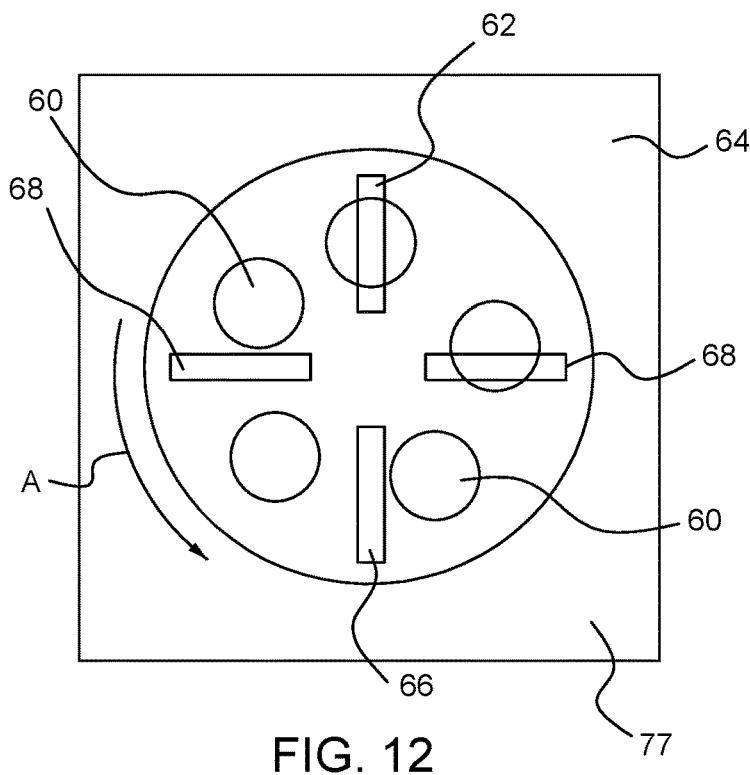
FIG. 12 is a plan view of a rotary s-ALD system, according to an embodiment.

FIG. 12 shows a rotary system similar to FIG. 11, where one substrate holder 60 on the circular holder 64 is aligned with the precursor source 62 and one is aligned with the purge area 68. One substrate holder 60 is just leaving plasma source 66 area. Relative rotation between the circular conveyor and the top section is shown by arrow A. As shown, this rotation is counterclockwise. It will be understood that the rotation could also be clockwise or oscillating. It will be further understood that movement may come from the circular conveyor or from the top section.

As will be understood, the circular s-ALD system described herein may be suitable for both batch and continuous processing. For continuous processing, an area where substrate holders may be added and removed may be included.

Example 3: Tailored Coating

This Example demonstrates a further manner in which surface modification may be accomplished. In this embodiment, a coating was designed which provided anti-tack properties, but with a higher refractive index. A $SiO_2$ coating was used for its anti-tack properties but preferred a coating with a slightly higher index. Titanium was incorporated into the $SiO_2$ by combining the TDMAT precursor with the BDEAS precursor. The TDMAT pressure was 2% of the BDEAS pressure.

Figure 13:
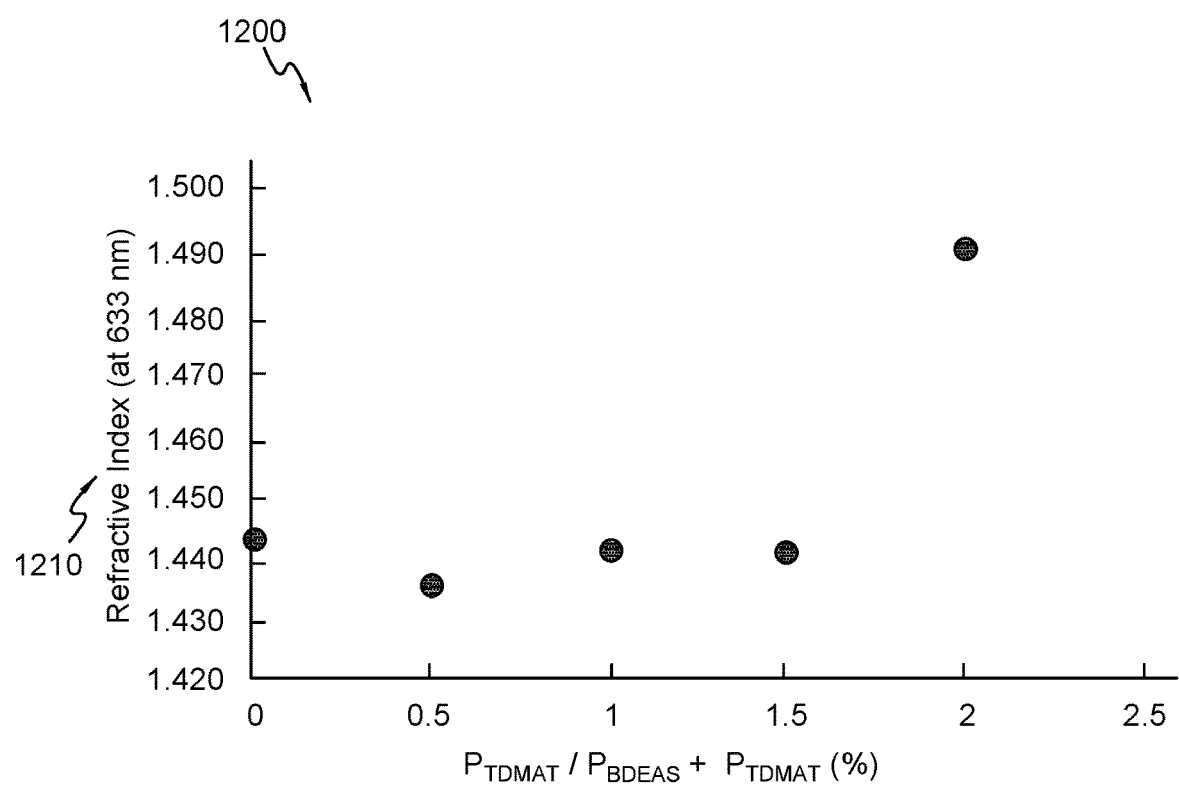
FIG. 13 is graph illustrating a change in refractive index of the coating by combining precursor gasses, according to an embodiment.

FIG. 13 is graph 1200 illustrating a change in refractive index of the coating 1210 as a function of different ratios of precursor gasses 1220, according to an embodiment. Graph 1200 shows that, in this Example, the refractive index of the coating was changed from approximately 1.44 to approximately 1.49 by the addition of about 1.5 to 2% TDMAT to the precursor gas.

Lenses coated in accordance with this Example 3 will have unfold times comparable to the lenses of Example 1.

The above specification, examples and data provide a complete description of the structure and use of exemplary embodiments as defined in the claims. Although various embodiments have been described above with a certain degree of particularity, or with reference to one or more individual embodiments, one having ordinary skill in the art could make numerous alterations to the disclosed embodiments without departing from the spirit or scope of the claimed embodiments. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the embodiment as defined in the following claims.

What is claimed is:

1. A method for coating an intraocular lens, the intraocular lens having a lens surface, the method comprising: delivering the intraocular lens to a conveyor, the intraocular lens positioned within an interior space set into a top surface of a substrate holder such that the intraocular lens is positioned below the top surface of the substrate holder; activating a processing device, the processing device comprising a plurality of coating segments, each coating segment comprising: a first inert gas source configured to provide a first inert gas directly to the intraocular lens on the conveyor, a precursor source configured to provide a precursor gas directly to the intraocular lens on the conveyor; a second inert gas source configured to provide a second inert gas to the intraocular lens on the conveyor; and a plasma source configured to provide plasma to the intraocular lens on the conveyor; wherein the first inert gas source, the precursor source, the second inert gas source, and the plasma source of each coating segment are separated from the top surface of the substrate holder by a process gap; adding a first layer of coating by passing the intraocular lens from the conveyor through a first coating segment of the processing device using relative movement between the processing device and the conveyor, adding the first layer of coating comprising the steps of: delivering the first inert gas into the interior space and to the intraocular lens via the first coating segment; delivering the precursor gas into the interior space and to the intraocular lens via the first coating segment, subsequent to providing the first inert gas; delivering the second inert gas into the interior space and to the intraocular lens via the first coating segment, subsequent to providing the precursor gas; and delivering the plasma into the interior space and to the intraocular lens via the first coating segment, subsequent to providing the second inert gas; and adding a second layer of coating by passing the intraocular lens via the conveyor through a second coating segment of the processing device directly after the first coating segment, adding the second layer of coating comprising the steps of: delivering the first inert gas into the interior space and to the intraocular lens via the second coating segment, subsequent to adding the first layer of coating; delivering the precursor gas into the interior space and to the intraocular lens via the second coating segment, subsequent to providing the first inert gas; delivering the second inert gas into the interior space and to the intraocular lens via the second coating segment, subsequent to providing the precursor gas; and delivering the plasma into the interior space and to the intraocular lens via the second coating segment, subsequent to providing the second inert gas, wherein a layer of coating is applied to the intraocular lens each time the intraocular lens passes under a coating segment.

2. The method of claim 1, wherein the intraocular lens is a molded intraocular lens.

3. The method of claim 1, wherein the intraocular lens comprises a lens body and at least one support structure, the method comprising displacing at least a portion of the support structure from a mold half that was used to mold one side of the lens body and the support structure.

4. The method of claim 1, wherein the substrate holder is formed at least in part by a portion that was used to form the intraocular lens.

5. The method of claim 1, wherein the substrate holder is a mold half.

6. The method of claim 1, wherein the substrate holder is a device configured to hold the intraocular lens during a lathing process.

7. The method of claim 1, wherein the first inert gas source, the precursor source, the second inert gas source, and the plasma source of each coating segment are positioned 1 mm to 5 mm apart from the lens surface.

8. The method of claim 1, wherein the precursor gas comprises one or more of bis(diethylamino) silane, tris (dimethylamino) silane, di(isopropylamino) silane, benzyltrimethylsilane, tetraethyl orthosilicate, hexamethyldisiloxane, tri-chloro-silane, aluminum bromide, aluminum trichloride, trimethyl-aluminum, trimethylamine alane, aluminum tri-sec-butoxide, Tetrakis(dimethylamino)titanium (IV), titanium tetrachloride, titanium tetraisopropoxide, and combinations thereof.

9. The method of claim 1, wherein the processing device deposits a coating of silicon dioxide on a surface comprising one of an anterior surface of the intraocular lens, a support structure coupled with the intraocular lens, or combinations thereof.

10. The method of claim 1, wherein the plasma source comprises one or more of oxygen plasma, nitrogen plasma, carbon monoxide plasma, carbon dioxide plasma, and nitric oxide plasma.

11. The method of claim 1, wherein the method is performed at a temperature of 25° C. to 90° C.

* * * * *